US008674647B2

(12) United States Patent
Iwaji et al.

(10) Patent No.: US 8,674,647 B2
(45) Date of Patent: Mar. 18, 2014

(54) DRIVE DEVICE FOR ALTERNATING CURRENT MOTOR AND ELECTRIC MOTOR VEHICLE

(75) Inventors: Yoshitaka Iwaji, Hitachinaka (JP); Daigo Kaneko, Hitachi (JP); Kouki Yamamoto, Mito (JP)

(73) Assignee: Hitachi, Ltd., Tokyo (JP)

( * ) Notice: Subject to any disclaimer, the term of this patent is extended or adjusted under 35 U.S.C. 154(b) by 586 days.

(21) Appl. No.: 13/030,168

(22) Filed: Feb. 18, 2011

(65) Prior Publication Data

US 2011/0204831 A1 Aug. 25, 2011

(30) Foreign Application Priority Data

Feb. 25, 2010 (JP) .................... 2010-040219

(51) Int. Cl.
*H02P 6/00* (2006.01)

(52) U.S. Cl.
USPC ...... 318/700; 318/400.01; 318/727; 318/599; 318/810; 318/400.32; 363/74; 363/21.1; 363/21.11; 363/76; 363/95; 363/98; 363/109; 324/524; 324/526

(58) Field of Classification Search
USPC ............... 318/244, 400.01, 700, 727, 749, 318/400.02, 400.05, 400.07, 599
See application file for complete search history.

(56) References Cited

U.S. PATENT DOCUMENTS

| 5,015,939 A | * | 5/1991 | Konecny ...................... 318/701 |
| 5,097,190 A | * | 3/1992 | Lyons et al. .................. 318/701 |
| 5,680,299 A | * | 10/1997 | Yasuda et al. ................. 363/41 |
| 6,172,498 B1 | * | 1/2001 | Schmidt et al. ........... 324/207.12 |
| 7,026,774 B2 | * | 4/2006 | Inaba et al. ................ 318/400.33 |
| 7,276,876 B2 | * | 10/2007 | Kaneko et al. ................. 318/716 |
| 7,412,339 B2 | * | 8/2008 | Ramu et al. ..................... 702/65 |
| 7,477,034 B2 | * | 1/2009 | MacKay ....................... 318/432 |
| 7,541,769 B2 | * | 6/2009 | Nawa et al. .................... 318/800 |

FOREIGN PATENT DOCUMENTS

| JP | 07-024598 A | 1/1995 |
| JP | 08-205578 A | 8/1996 |
| JP | 2001-169560 A | 6/2001 |
| JP | 2001-286198 A | 10/2001 |
| JP | 2002-078391 A | 3/2002 |
| JP | 2002-291283 A | 10/2002 |
| JP | 2003-199389 A | 7/2003 |
| JP | 2006-230169 A | 8/2006 |
| JP | 2007-129844 A | 5/2007 |
| JP | 2007-306754 A | 11/2007 |

* cited by examiner

*Primary Examiner* — Rita Leykin
(74) *Attorney, Agent, or Firm* — Miles & Stockbridge P.C.

(57) ABSTRACT

Provided is a drive device for an alternating current motor which performs vector control on sensorless driving of the alternating current motor in an extremely low speed region without applying a harmonic voltage intentionally while maintaining an ideal PWM waveform. A current and a current change rate of the alternating current motor are detected, and a magnetic flux position inside of the alternating current motor is estimated and calculated in consideration of an output voltage of an inverter which causes this current change. The current change rate is generated on the basis of a pulse waveform of the inverter, and hence the magnetic flux position inside of the alternating current motor can be estimated and calculated without applying a harmonic wave intentionally.

16 Claims, 30 Drawing Sheets

θd AND VOLTAGE VECTOR

VOLTAGE COMMAND AND VOLTAGE VECTOR

CASE WHERE INDUCTANCE IS UNIFORM

CASE WHERE INDUCTANCE CHANGES

CASE WHERE INDUCTANCE CHANGES

CASE WHERE INDUCTANCE IS UNIFORM

IDEAL LINE-TO-LINE VOLTAGE
WAVEFORM DURING PWM

LINE-TO-LINE VOLTAGE
WAVEFORM AFTER PULSE SHIFT

IDEAL LINE-TO-LINE VOLTAGE WAVEFORM DURING PWM

LINE-TO-LINE VOLTAGE WAVEFORM WHEN HARMONIC WAVE IS APPLIED ACCORDING TO CONVENTIONAL EXAMPLE

WITHOUT APPLICATION OF HARMONIC WAVE

WITH APPLICATION OF HARMONIC WAVE

US 8,674,647 B2

DRIVE DEVICE FOR ALTERNATING CURRENT MOTOR AND ELECTRIC MOTOR VEHICLE

The present application is based on and claims priority of Japanese patent application No. 2010-040219 filed on Feb. 25, 2010, the entire contents of which are hereby incorporated by reference.

BACKGROUND OF THE INVENTION

1. Field of the Invention

The present invention relates to a motor control technology for controlling as desired the number of revolutions or a torque of an alternating current motor, such as an induction motor and a permanent magnet synchronous motor, in an extremely low speed region close to zero speed, and more particularly, to a drive device for an alternating current motor and an electric motor vehicle using sensorless control, in which a rotational position angle and speed information of a rotor of the electric motor are not detected directly by a sensor.

2. Description of the Related Art

In order to control an alternating current motor in a highly responsive and accurate manner, it is necessary to manage a torque of the electric motor. For this purpose, it is necessary to detect the number of revolutions (in the case of a synchronous motor, position (angle) information of a rotor) of the electric motor by means of a sensor, and further detect a phase current of the electric motor. After that, torque current components and excitation current components contained in the current need to be separated and controlled independently of each other inside of a controller. This technology is widely used as vector control.

In the vector control, speed (or position) information of the rotor is essential, and on the other hand, there arise problems of a reduction in reliability, an increase in the amount of work for attachment and adjustment, an increase in costs, and the like due to sensors for the essential information. As a solution to the problems, a sensorless control technology which does not directly use the speed or position information of the rotor has been developed, and has already been put into practical use. According to the sensorless control technology, stable driving can be achieved by a method based on an induced voltage of the electric motor in a region in which the rotational speed is high, whereas it is extremely difficult to realize the vector control in a region close to zero speed in which the induced voltage becomes smaller. For example, conventional examples as disclosed in the following patent documents can be given as the sensorless control technology for the region close to zero speed.

The following patent documents each relate to a method of utilizing the saliency of the rotor of the alternating current motor, in which a property that a change in a rotor position changes an inductance is utilized. For this reason, the saliency of the electric motor is essential. Japanese Patent Laid-Open Publication No. 2001-286198 (Patent Document 2) is directed to an induction motor, magnetic saturation of an iron core is generated also in the induction motor by causing an excitation current to flow therethrough, and the saliency is slightly generated in a magnetic circuit, so that the generated saliency can be utilized.

According to methods disclosed in Japanese Patent Laid-Open Publication Nos. 07-24598, 2001-286198, and 2002-291283 (Patent Documents 1 to 3), in order to observe the saliency as described above, a harmonic voltage is intentionally applied to the electric motor to thereby give variations to a current, and a magnetic flux position inside of the electric motor is estimated on the basis of the current variation amount.

For example, in a representative drawing (FIG. 1) of Japanese Patent Laid-Open Publication No. 2001-286198 (Patent Document 2), a high-frequency wave generator denoted by part number 4 generates a harmonic voltage, and the generated voltage is added to an output voltage $V\gamma^*$ of a current controller. In addition, a current is of the electric motor is detected by a current sensor 12, and high-frequency components are taken out via a band-pass filter (BPF) 9. The magnetic flux position inside of the electric motor is estimated on the basis of the taken-out high-frequency current components.

In the case of the vector control of the alternating current motor, the linearization of a torque is a principal purpose, and the magnetic flux position inside of the electric motor may be detected for this purpose. In a permanent magnet synchronous motor, normally, the magnetic flux position and the rotor position coincide with each other. Therefore, if a rotor position sensor is provided, the magnetic flux position can be detected, but if no sensor is provided, a certain estimated calculation is required. Similarly in the case of an induction motor which is an alternating current motor other than the synchronous motor, if the magnetic flux position can be estimated, the degree of "slip" can be determined, whereby the vector control is established.

Japanese Patent Laid-Open Publication No. 2007-129844 (Patent Document 4) relates to an invention which has an object to reduce the amount of the applied harmonic voltage in Japanese Patent Laid-Open Publication Nos. 07-24598, 2001-286198, and 2002-291283 (Patent Documents 1 to 3). An external detector for a current change amount is provided, and the magnetic flux position is estimated and calculated on the basis of the detected current change amount. In the configuration of the detector for the current change amount, a current change rate of the electric motor is first detected, and the detected current change rate is integrated during the application period of the harmonic wave, to be thereby converted into the current change amount.

Japanese Patent Laid-Open Publication No. 2002-78391 (Patent Document 5) has basically the same perspective as those in Japanese Patent Laid-Open Publication Nos. 07-24598, 2001-286198, and 2002-291283 (Patent Documents 1 to 3), and describes a method of directly detecting the current change amount similarly to Japanese Patent Laid-Open Publication No. 2007-129844 (Patent Document 4). Patent Document 5 describes an example in which an external inductance is provided as a sensor for the current change rate.

Japanese Patent Laid-Open Publication No. 2001-169560 (Patent Document 6) utilizes the saliency of the electric motor similarly to Japanese Patent Laid-Open Publication Nos. 07-24598, 2001-286198, 2002-291283, 2007-129844, and 2002-78391 (Patent Documents 1 to 5). According to the invention disclosed in Patent Document 6, a harmonic voltage is applied to a phase assumed as the magnetic flux position of the electric motor, a harmonic current generated at this time is treated as a vector quantity, and the direction of the vector is controlled so as not to be displaced from a harmonic wave application direction, whereby the magnetic flux position of the electric motor and the estimated position for control are made coincident with each other.

In Japanese Patent Laid-Open Publication No. 08-205578 (Patent Document 7), unlike the other patent documents, the application of a harmonic wave is not performed basically. Ripples in a harmonic current generated by a normal PWM operation are detected, and a simultaneous equation is solved from the current ripples and a constant of the electric motor, whereby the magnetic flux position is estimated and calculated.

All of the methods disclosed in Japanese Patent Laid-Open Publication Nos. 07-24598, 2001-286198, 2002-291283, 2007-129844, 2002-78391, and 2001-169560 (Patent Documents 1 to 6) require the intentional application of a harmonic voltage. Returning to the principle of the vector control of the alternating current motor, the application of a harmonic voltage is not required originally, and rather, a large number of disadvantages occur as the drive device for the electric motor.

In FIGS. 29A and 29B, a comparison is made between a waveform of a line-to-line voltage applied to the electric motor when the application of a harmonic wave is not performed (FIG. 29A) and a waveform of a line-to-line voltage applied thereto when the application of a harmonic wave is performed (FIG. 29B). In ideal pulse width modulation, with respect to a cycle of a fundamental wave, pulses appear only on the positive side in a half cycle, and appear only on the negative side in the other half cycle, so that an amount of generated harmonic wave is minimized. However, if a harmonic wave is applied intentionally, the waveform as shown in FIG. 29B appears, and the amount of generated harmonic wave increases at once. In addition, the current waveform of the motor changes as shown in FIGS. 30A and 30B depending on whether or not a harmonic wave is applied.

The application of a harmonic wave as described above causes various problems. For example, electromagnetic noise from the electric motor increases. In order to increase the estimation sensitivity for the magnetic flux of the electric motor, it is necessary to reduce the frequency of the harmonic voltage or increase the amplitude thereof, and both cases lead to the increase in noise within an audible range (several 100 Hz to several kHz). In addition, a large amount of harmonic components is generated in a drive current for the electric motor, so that loss (mainly, iron loss) caused by the harmonic wave considerably increases. The increase in loss leads directly to a problem of heat generation, and thus becomes an extremely important factor in terms of the design of a motor drive system.

In Japanese Patent Laid-Open Publication No. 2007-129844 (Patent Document 4), a reduction in the harmonic voltage is realized, but the loss caused by the harmonic wave largely occurs even by a slight amount of application. In a normal pulse width modulation system (PWM system), carrier wave (carrier) frequency components, which are zero-phase components, are not generated, and only sideband wave components (neighboring the carrier wave) having a small amplitude are contained in the electric motor current. However, if the harmonic wave is applied intentionally, the applied components themselves directly become a harmonic current to be largely generated, so that a loss larger than expected occurs.

In Japanese Patent Laid-Open Publication No. 2002-78391 (Patent Document 5), although an example of detecting the current change rate is described, the contents of the invention are strictly an algorithm for "the current change amount", and a specific method of directly utilizing the current change rate is not described.

In Japanese Patent Laid-Open Publication No. 08-205578 (Patent Document 7), although there is a description that the magnetic flux position is estimated from the current ripples without performing special PWM, in actuality, the special PWM for increasing a pulse width is required in a low speed region in which an output pulse width of an inverter becomes smaller, with the result that the harmonic current is increased. In addition, an external circuit for detecting the current ripples is essential, and this is not practical in consideration of ringing caused by switching of the inverter and the like.

Further, the simultaneous equation is solved from the constant of the electric motor inside of the controller, whereby the position of a magnetic pole is calculated. However, the non-linearity of a magnetic circuit is strong in the electric motor of recent years, and hence it is becoming difficult to treat the constant of the electric motor as a "constant". Therefore, it can be said that the direct use of this method is difficult.

SUMMARY OF THE INVENTION

The summary of a representative one of aspects disclosed in the present application is briefly described as follows.

A drive device for an alternating current motor according to a representative embodiment of the present invention is a drive device for an alternating current motor, including: an inverter which performs electric power conversion from a direct current to an alternating current; the alternating current motor which is connected to the inverter; and a controller which outputs a pulse width modulation signal to the inverter, to thereby control the inverter, the drive device for the alternating current motor characterized by including means for: applying a voltage to the alternating current motor so that, with respect to 360 degrees which is a fundamental wave cycle of an alternating current output, a line-to-line voltage waveform of the inverter is such an ideal drive waveform as to exhibit a continuous positive pulse train during one 180-degree period and exhibit a continuous negative pulse train during another 180-degree period; and detecting a current and a current change rate of the alternating current motor, the alternating current motor being controlled on the basis of the detection values.

Effects obtained by the representative one of the aspects disclosed in the present application are briefly described as follows.

For the purpose of estimating and calculating a magnetic flux inside of the alternating current motor, a harmonic voltage is not applied intentionally, and hence the output waveform of the inverter becomes an ideal pulse width modulation waveform. As a result, electromagnetic noise and loss caused by the harmonic wave are minimized. In particular, in a high-capacity alternating current motor, an absolute value of a harmonic current is large, and hence generation amounts of the electromagnetic noise and the loss are dramatically reduced. Further, a mathematical expression model and a data table are prepared in advance for an excessive inductance of the alternating current motor, which makes it possible to drive, without any problem, even an electric motor including a magnetic circuit which changes in a nonlinear manner.

DETAILED DESCRIPTION OF THE PREFERRED EMBODIMENTS

Hereinafter, embodiments of the present invention are described with reference to the drawings.

Embodiment 1

Figure 1:
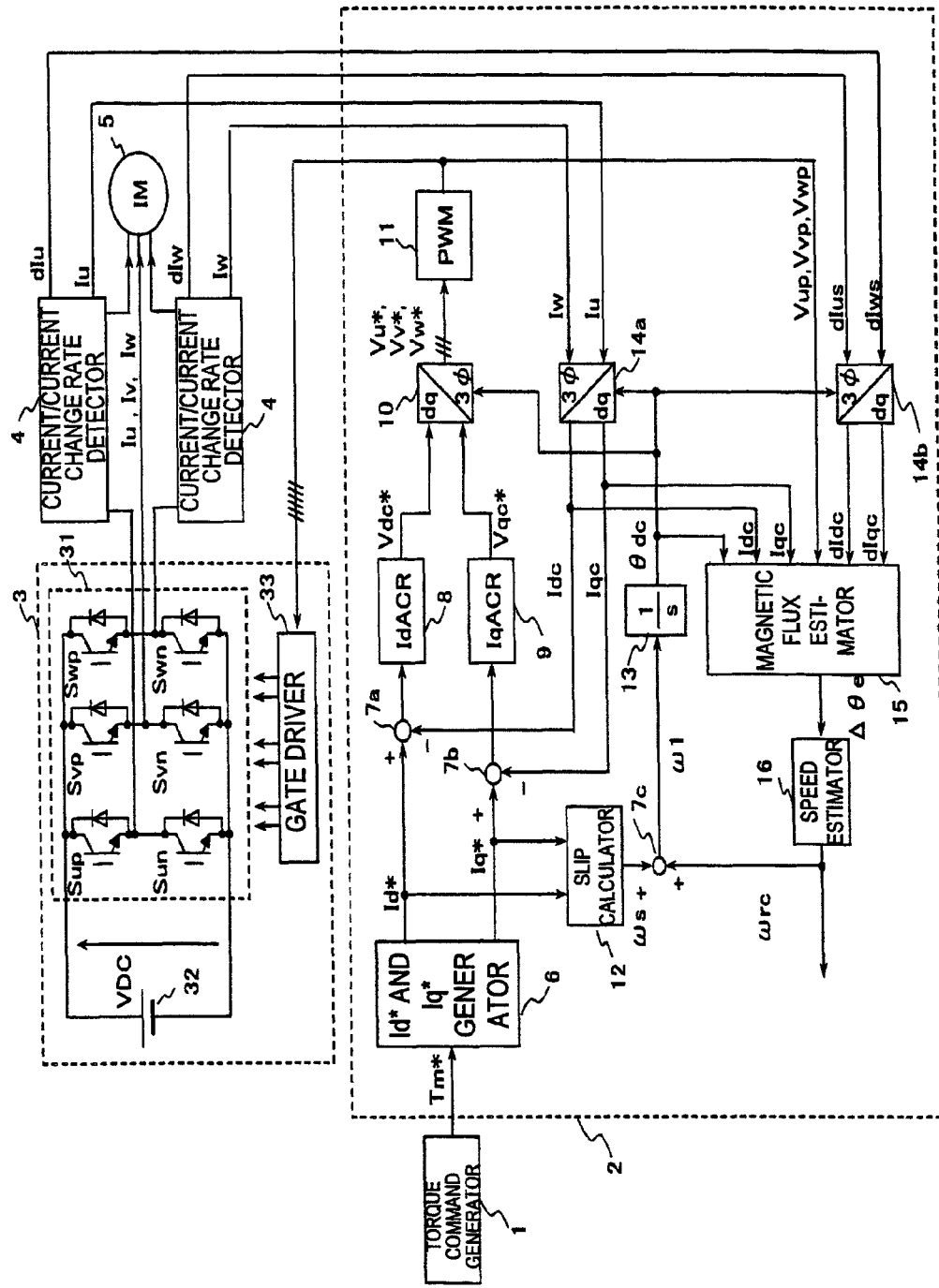
FIG. 1 is a block diagram illustrating a configuration of a drive device for an alternating current motor according to Embodiment 1 of the present invention.

FIG. 1 is a block diagram illustrating a configuration of a drive device for an alternating current motor according to Embodiment 1 of the present invention.

This device is intended to drive a three-phase induction motor. In the rough definition, this device includes: a torque command generator 1; a controller 2; an inverter 3 including an inverter main circuit 31, an inverter power supply 32, and a gate driver 33; a current/current change rate detector 4; and a three-phase induction motor 5 (hereinafter, abbreviated as induction motor) to be driven.

The torque command generator 1 is means for issuing a generation torque command Tm* of the induction motor 5, and is a controller disposed upstream of the controller 2. A speed controller which adjusts the number of revolutions of the induction motor 5 may be provided further upstream of the torque command generator, but is omitted in the present embodiment.

The controller 2 calculates a voltage applied to the induction motor 5 so that an actually generated torque of the induction motor 5 coincides with the torque command Tm*, performs pulse width modulation, and outputs a gate signal for switching the main circuit of the inverter. The controller 2 includes an Id* and Iq* generator 6 (a generator for a d-axis current command Id* and a q-axis current command Iq*), adder-subtracters 7a to 7c, a d-axis current controller (IdACR) 8, a q-axis current controller (IqACR) 9, a dq reverse converter 10, a PWM (pulse width modulation) generator 11, a slip calculator 12, an electrical angle phase calculator 13, and dq converters 14a and 14b as well as a magnetic flux estimator 15 and a speed estimator 16 which are characteristic features of the present invention.

Next, an operation of the respective parts is described.

On the basis of the torque command Tm* issued from the torque command generator 1, the excitation current command Id* and the torque current command Iq* are calculated by the Id* and Iq* generator 6. Normally, the induction motor 5 is controlled by a mechanism in which Id* is fixed to a constant value and Iq* is made proportional to the torque command Tm*, to thereby generate a torque. Deviations of an actual excitation current component Idc and an actual torque current component Iqc of the induction motor with respect to Id* and Iq* are calculated by the adder-subtracters 7a and 7b, respectively. On the basis of the calculated deviations, voltage commands Vdc* and Vqc* on the d-axis and the q-axis are calculated by the d-axis current controller (IqACR) 8 and the q-axis current controller (IqACR) 9, respectively.

It should be noted that the d-axis current controller 8 and the q-axis current controller 9 are control blocks which are intended to reduce the corresponding deviations, and may have any control configuration, for example, proportional integral control without any problem. In addition, in the case of the induction motor, it is necessary to appropriately control a slip frequency in accordance with a load condition. In the present embodiment, a slip frequency ωs is calculated by the slip calculator 12 in accordance with Id* and Iq* to be added to an estimate value ωrc of a rotational speed, to thereby calculate ω1 which is a drive frequency of the induction motor 5.

In the vector control, a current of the induction motor 5 is observed for control on a rotating coordinate axis with reference to a secondary magnetic flux of the induction motor 5. A phase angle θdc of this rotating coordinate axis is obtained by integrating the drive frequency ω1 by means of an integrator. This calculation is performed by the electrical angle phase calculator 13. On the basis of the phase angle θdc, phase currents Iu and Iw of the induction motor 5 are converted into current values Idc and Iqc on the d- and q-coordinate axes by the dq converter 14a. Similarly, the voltage commands Vdc* and Vqc* on the d- and q-axes are reversely converted into voltage commands Vu*, Vv*, and Vw* on the three-phase alternating current axis. Vu*, Vv*, and Vw* are subjected to pulse width modulation by the PWM generator 11 to be outputted to the inverter 3.

In the present invention, current change rates dIu and dIw of the phase currents of the induction motor 5 are also detected to be taken into the controller 2. dIu and dIw are subjected to coordinate conversion based on θdc by the dq converter 14b to become current change rates dIdc and dIqc on the d- and q-axes.

The magnetic flux estimator 15 which is the characteristic feature of the present invention estimates a magnetic flux inside of the induction motor 5 on the basis of the phase angle θdc, the currents Idc and Iqc, the current change rates dIdc and dIqc, and output pulses Vup, Vvp, and Vwp, and outputs Δθe which is a state quantity relating to a displacement angle between the magnetic flux inside of the induction motor and the estimated magnetic flux for control. The detail of the magnetic flux estimator 15 will be described later. The speed estimator 16 estimates and calculates a rotational speed on the basis of Δθe.

In addition, the gate driver 33 is controlled by a signal from the PWM generator 11, to thereby perform on/off control of respective devices of the inverter main circuit 31. The inverter main circuit 31 includes six switching elements Sup to Swn. In addition, the current/current change rate detector 4 is attached to a U phase and a W phase, and detects phase currents and change rates of the phase currents.

Figure 2:
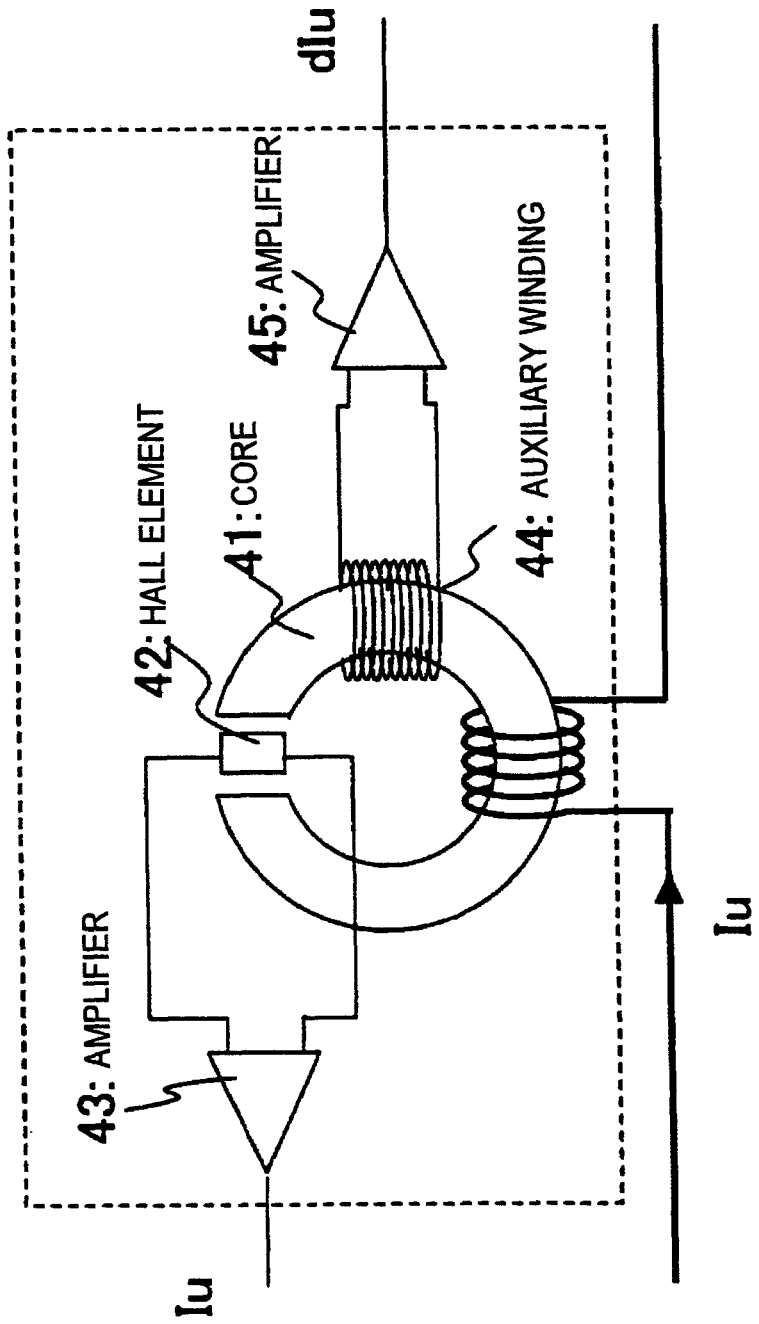
FIG. 2 is a diagram illustrating a configuration of a current/current change rate detector of the drive device for the alternating current motor according to Embodiment 1 of the present invention.

The current/current change rate detector 4 has a structure as illustrated in FIG. 2. The current/current change rate detector 4 includes: a core member 41 on which a wire connecting the inverter 3 and the induction motor 5 is wound; a Hall element 42 which detects a magnetic flux inside of the core member 41, and generates a voltage proportional to a phase current; an amplifier 43 which amplifies the voltage of the Hall element; an auxiliary winding 44 wound on the core member 41; and an amplifier 45 which amplifies an electromotive voltage of the auxiliary winding. A normal current sensor (Hall CT) includes the core member 41, the Hall element 42, and the amplifier 43, and an output of the amplifier 43 corresponds to a current detection value.

In the present invention, the auxiliary winding 44 is wound on the core member, and the electromotive voltage thereof is proportional to the current change rate, whereby the current change rate dIu is directly detected.

It is not impossible to detect the current change rate by once reading the current detection value (for example, Iu) into the controller and subjecting the read value to differential processing. However, to achieve this, there are some problems to be solved. First of all, it is necessary to increase the resolution of current detection. The current detection is mainly performed by an analog circuit, and hence a detection error of approximately 1% occurs inevitably. On the other hand, the current change amount is several %, and hence sufficient resolution cannot be obtained. In addition, in order to obtain the change amount, it is necessary to detect a current value between two points with a given time interval, and hence when a pulse having a narrow width is applied, it is difficult to obtain this time interval.

Secondarily, an error factor derived from the differential processing itself can be conceived. Differential performed by the controller must become imperfect differential in principle, and hence an error is contained inevitably. As the imperfect differential is brought closer to exact differential, the accuracy is more enhanced in principle, but error components may be increased due to an influence of noise contained in the detection value.

In the present invention, the current change rate itself is directly detected by the current/current change rate detector 4 at a high sensitivity. This eliminates the need to calculate "difference", which leads to considerable improvement in restrictions on control. It becomes possible to read even a pulse having a narrow width as the "change rate" into the controller.

Figure 3:
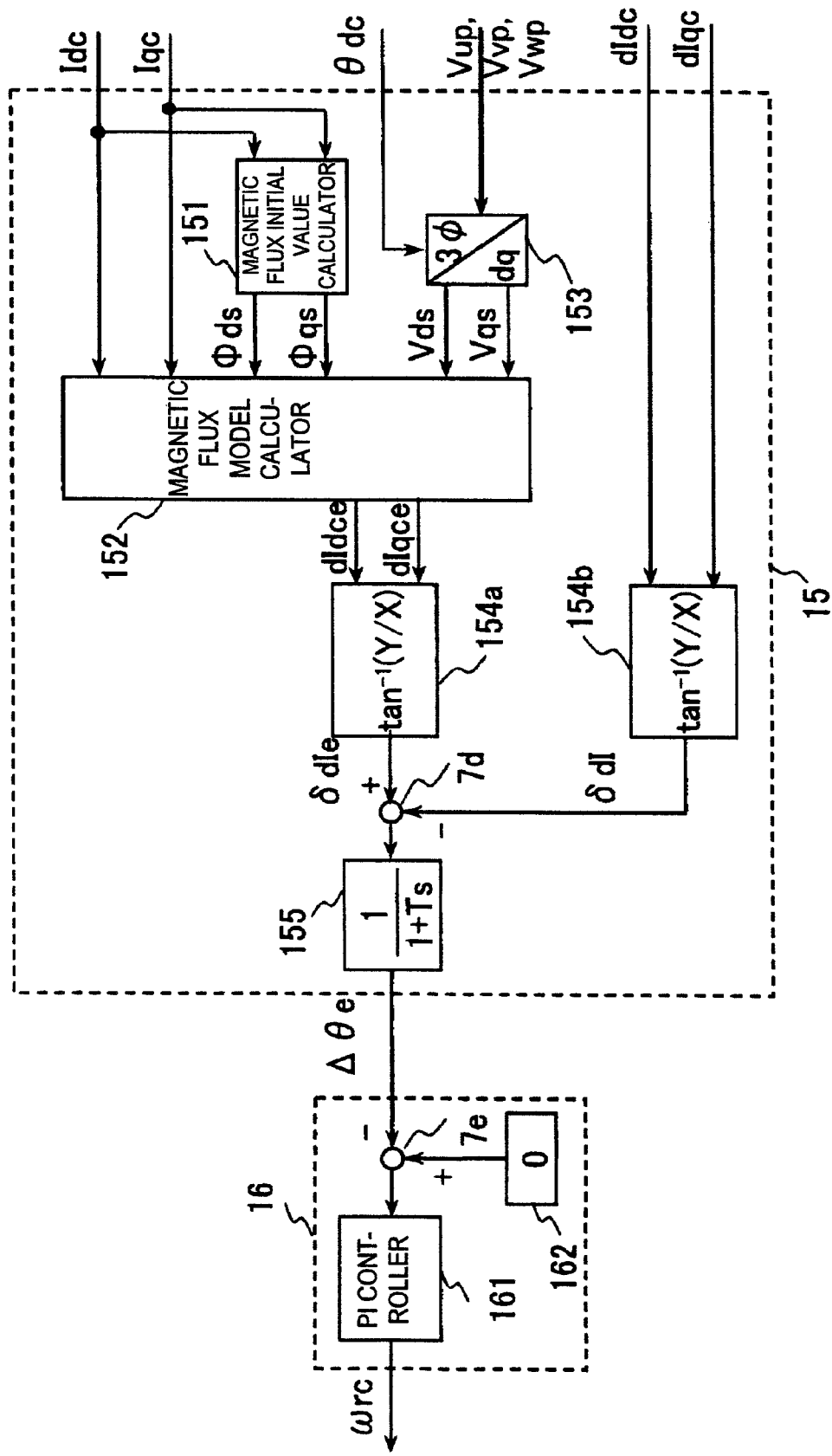
FIG. 3 is a diagram illustrating details of a magnetic flux estimator 15 and a speed estimator 16 according to Embodiment 1 of the present invention.

Next, the detail of the magnetic flux estimator 15 which is the characteristic feature of the present invention is described with reference to FIG. 3 to FIG. 5. FIG. 3 is a diagram illustrating internal blocks of the magnetic flux estimator 15 and the speed estimator 16. In FIG. 3, in the magnetic flux estimator, magnetic flux initial values Φds and Φqs on the respective d- and q-axes are calculated by a magnetic flux initial value calculator 151 on the basis of the currents Idc and Iqc. In addition, PWM pulses are converted by a dq converter 153 into voltages Vds and Vqs on the d- and q-axes by using a phase θdc, and these state quantities Idc, Iqc, Φds, Φqs, Vds, and Vqs are inputted to a magnetic flux model calculator 152. The magnetic flux model calculator 152 simulates the magnetic flux inside of the induction motor 5, and calculates current change rates dIdce and dIqce. From the calculated current change rates, a phase based on the d-axis is calculated by an arc tangent calculator 154a, to thereby calculate a current change rate phase estimate value δdIe.

Similarly, with regard to dIdc and dIqc which are values obtained by directly detecting the current change rates, a phase angle δdI is obtained by an arc tangent calculator 154b. Originally, δdI and δdIe should coincide with each other. If the deviation Δθe between δdI and δdIe exists, this is just because the magnetic flux position is displaced. Accordingly, the rotational speed may be modified so that δdI and δdIe coincide with each other. It should be noted that values of δdIe and δdI are different depending on states of the PWM pulses, and thus are stabilized by a filter 155. The speed estimator outputs the speed estimate value ωrc so that Δθe becomes zero. In FIG. 3, a proportional integral controller (PI controller) 161 performs such a control that Δθe becomes zero. A zero generator 162 gives "zero" as a command for Δθe.

Figure 4:
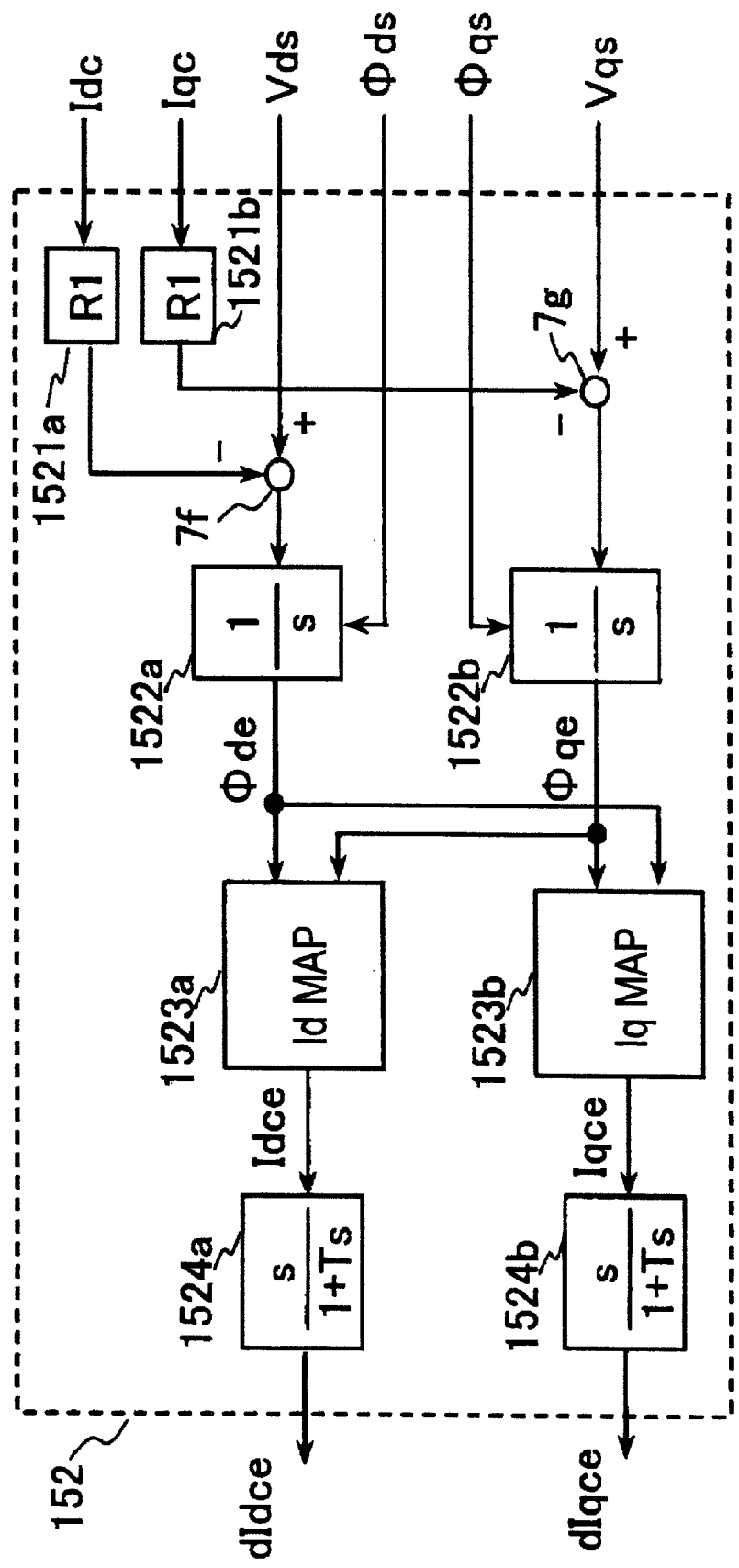
FIG. 4 is a diagram illustrating a detail of a magnetic flux model calculator 152 according to Embodiment 1 of the present invention.

FIG. 4 is a diagram illustrating an inside of the magnetic flux model calculator 152. A voltage drop by a winding resistance of the induction motor 5 is calculated by resistance setters 1521a and 1521b, and after that, an applied voltage is integrated, whereby the magnetic flux inside of the induction motor 5 is calculated in real time. Integrators 1522a and 1522b use ads and Φds and Φqs as initial values, respectively, and calculate a change of the magnetic flux inside of the induction motor 5. On the basis of an Id map 1523a and an Iq map 1523b which are magnetic flux maps 1 for the respective d-axis and q-axis, current values Idce and Iqce are calculated. These operations are mere simulations of the internal state of the induction motor 5, but saturation characteristics of a magnetic circuit need to be taken into consideration in the respective maps. Alternatively, instead of the maps, mathematical expression models for the magnetic saturation characteristics may be used without any problem. The current estimate values Idce and Iqce are current values themselves, and thus are converted into the change rates. The conversion into the change rates is performed by imperfect differentiators 1524a and 1524b. In the case of differential on the simulation, it is possible to proceed the processing with an influence of noise not becoming a particularly significant problem.

Figure 5:
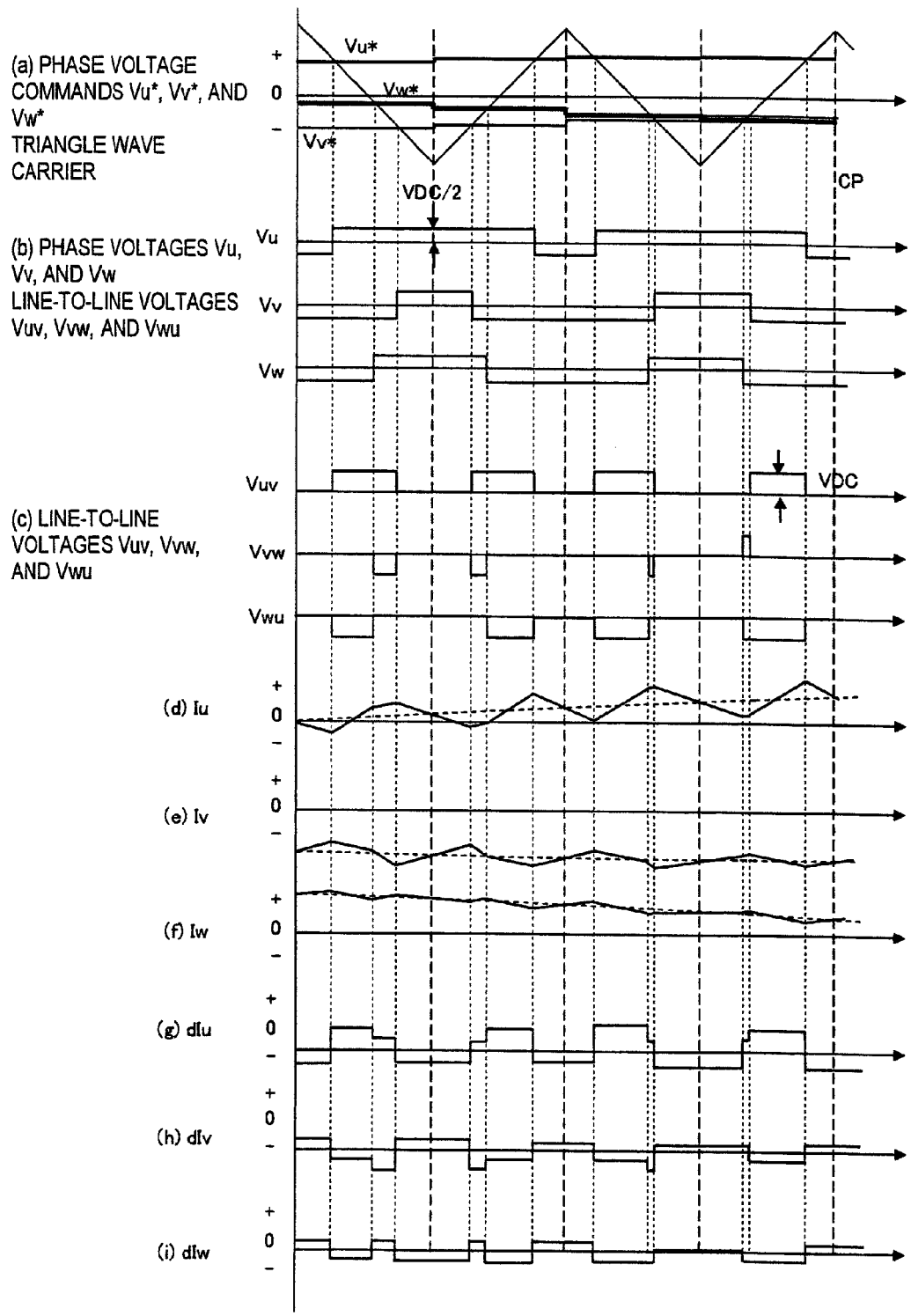
FIG. 5 is a chart showing waveforms of respective sections according to Embodiment 1 of the present invention.

FIG. 5 shows waveform examples from the PWM pulses to the current change rates. (a) of FIG. 5 shows a triangle wave carrier and the voltage commands Vu*, Vv*, and Vw* when the PWM pulses are generated. The PWM pulses are generated from a magnitude relation between the respective voltage commands and the triangle wave carrier, and on the basis of the generated pulses, phase voltages as shown in (b) of FIG. 5 are outputted from the inverter. Line-to-line voltages have waveforms as shown in (c) of FIG. 5. As a result, the respective phase currents are as shown in (d) to (f) of FIG. 5, and pulsating currents are generated so as to be linked to the PWM waveforms. Change rates, that is, differential values of the generated pulsating currents are as shown in (g) to (i) of FIG. 5. When these current change rates are observed on the d- and q-axes, vectors which each indicate a given direction depending on the applied voltage and the magnetic flux position at this time are obtained. The simulation similar to this is performed also inside of the magnetic flux estimator 15 to obtain vectors of the current change rates, and the obtained values are compared with actual detection values, whereby the displacement amount of the magnetic flux position can be estimated. That is, the magnetic flux estimator 15 estimates and calculates (g) to (i) of FIG. 5 on the d- and q-axes. If Δθe corresponding to the error of the magnetic flux estimate value can be made zero, the sensorless control is established.

According to the present invention, the current change rate of the phase current of the induction motor is directly detected, whereby the magnetic flux position can be estimated without specially applying a harmonic wave.

Embodiment 2

Next, Embodiment 2 of the present invention is described.

In Embodiment 1, a description is given on the assumption that the controller 2 is realized by the analog circuit, and hence high-speed processing is essential to realize the controller by digital control. As a matter of course, if special gate logic is employed, it is not impossible to realize the controller by digitalization, but a circuit scale will be enormous.

In Embodiment 2, on the assumption of applying a microcomputer for industrial purposes or the like, a practical example is described with reference to FIG. 6 to FIG. 10.

Figure 6:
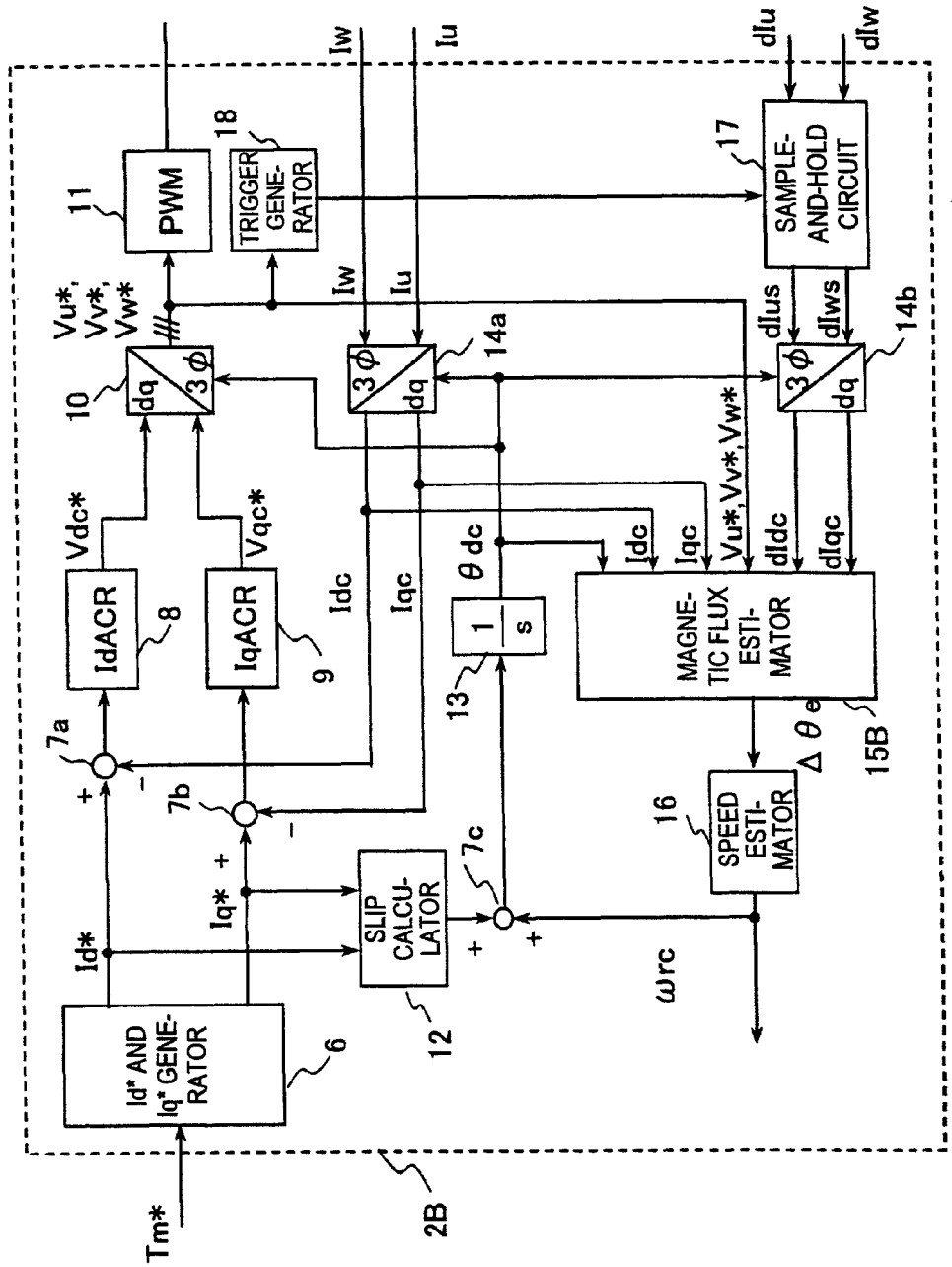
FIG. 6 is a block diagram illustrating a controller 2B of a drive device for an alternating current motor according to Embodiment 2 of the present invention.

FIG. 6 is a block configuration diagram illustrating a controller 2B which is a characteristic feature of Embodiment 2. Embodiment 2 is implemented by adopting the controller 2B instead of the controller 2 in FIG. 1.

Figure 7:
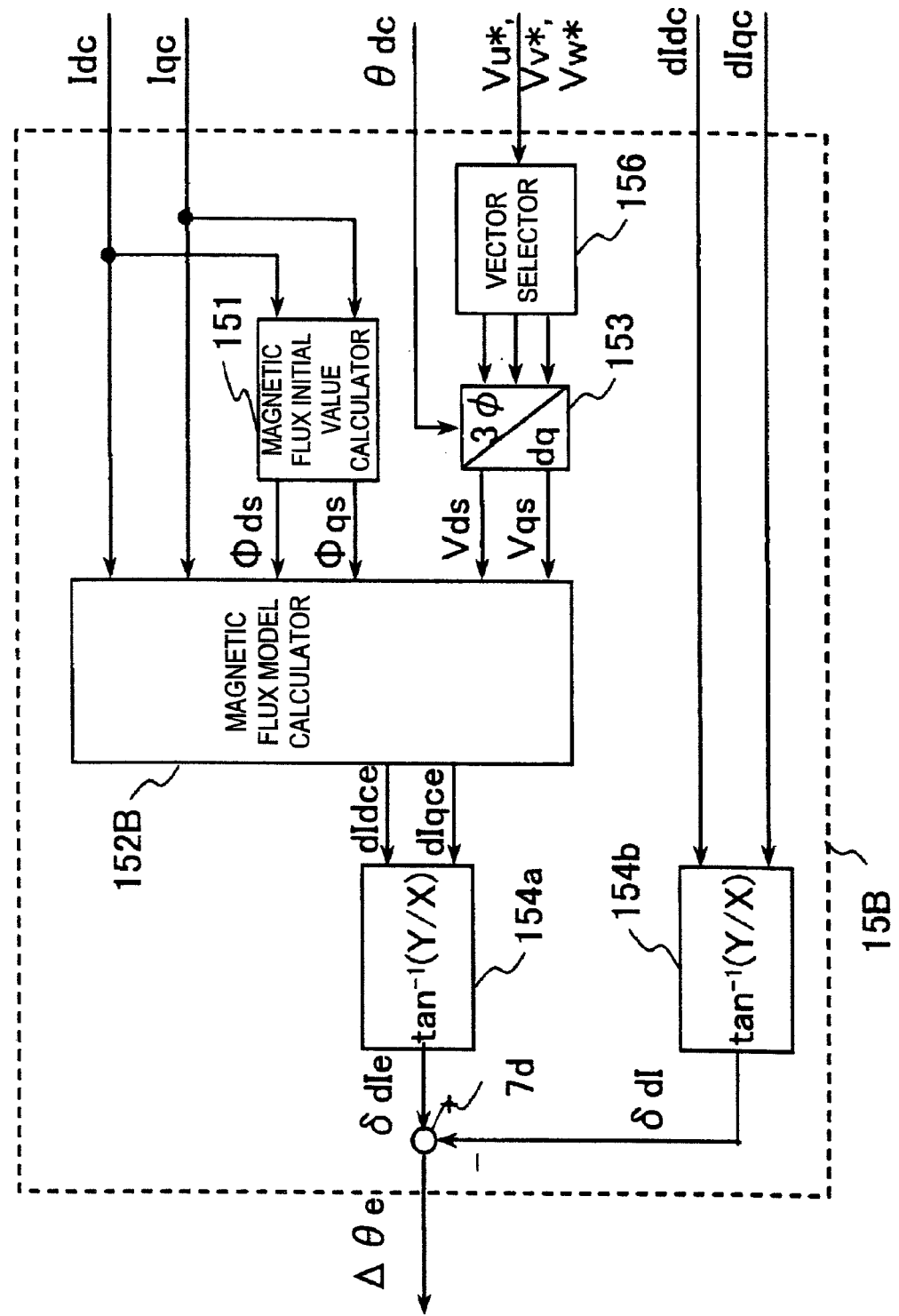
FIG. 7 is a diagram illustrating a detail of a magnetic flux estimator 15B according to Embodiment 2 of the present invention.
Figure 8:
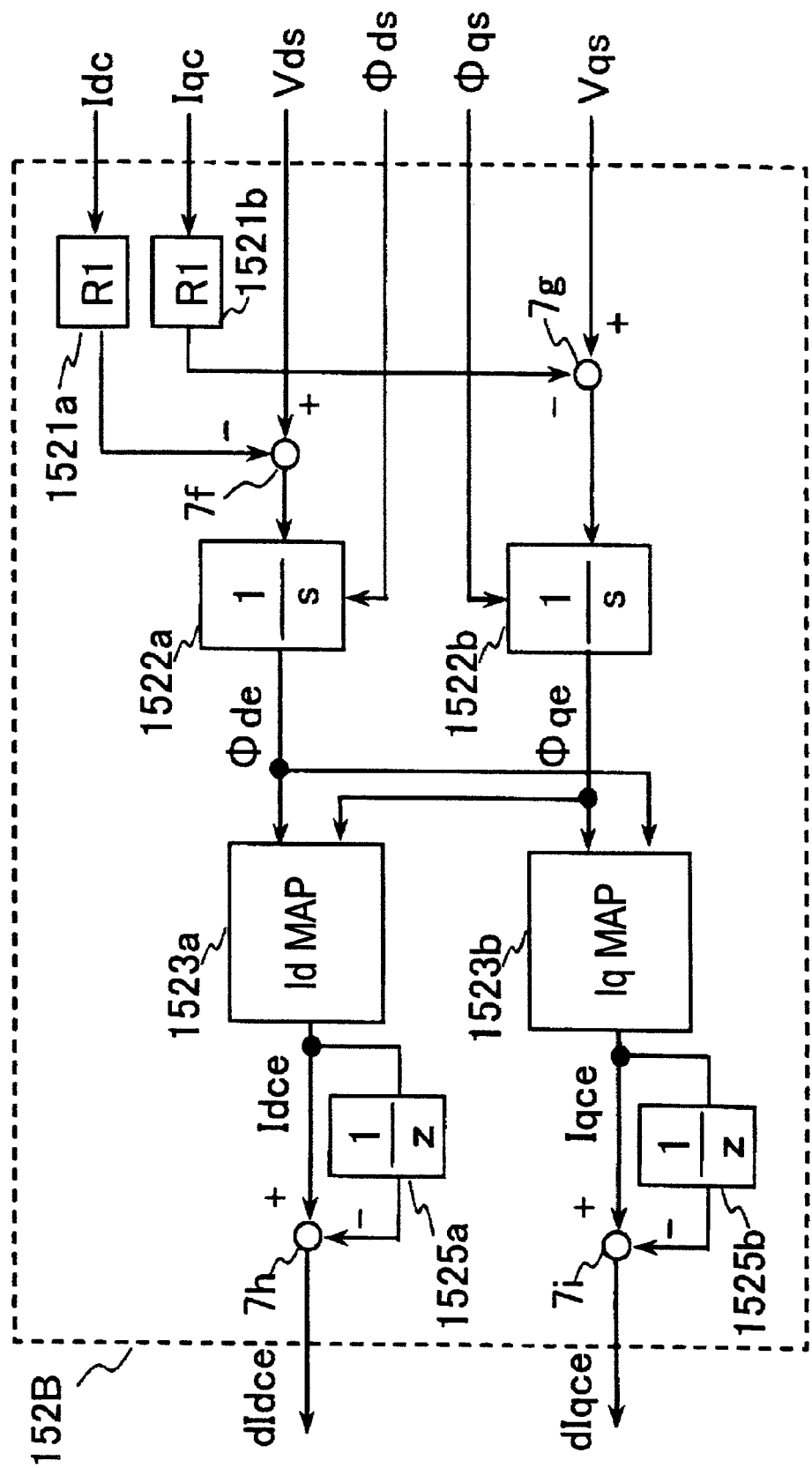
FIG. 8 is a diagram illustrating a detail of a magnetic flux model calculator 152B according to Embodiment 2 of the present invention.

In FIG. 6, the blocks denoted by part numbers 6 to 14 and 16 are identical with those denoted by the same numbers illustrated in FIG. 1. The characteristic features of the present embodiment are a magnetic flux calculator 15B, a sample-and-hold circuit 17, and a trigger generation circuit 18. FIG. 7 is a diagram illustrating an internal block of the magnetic flux estimator 15B, and FIG. 8 is a diagram illustrating an internal block of a magnetic flux model calculator 152B. Similarly in these figures, the components denoted by the same numbers as those in FIG. 3 and FIG. 4 in Embodiment 1 are identical therewith. In FIG. 7, the filter 155 in FIG. 3 is removed, and a vector selector 156 is newly added. In addition, in FIG. 8, delay elements 1525a and 1525b and adder-subtracters 7h and 7i are added instead of the imperfect differentiators 1524a and 1524b in FIG. 4. Embodiment 2 is the same as Embodiment 1 in the other configuration.

Next, the operation principle of Embodiment 2 is described.

Figure 9:
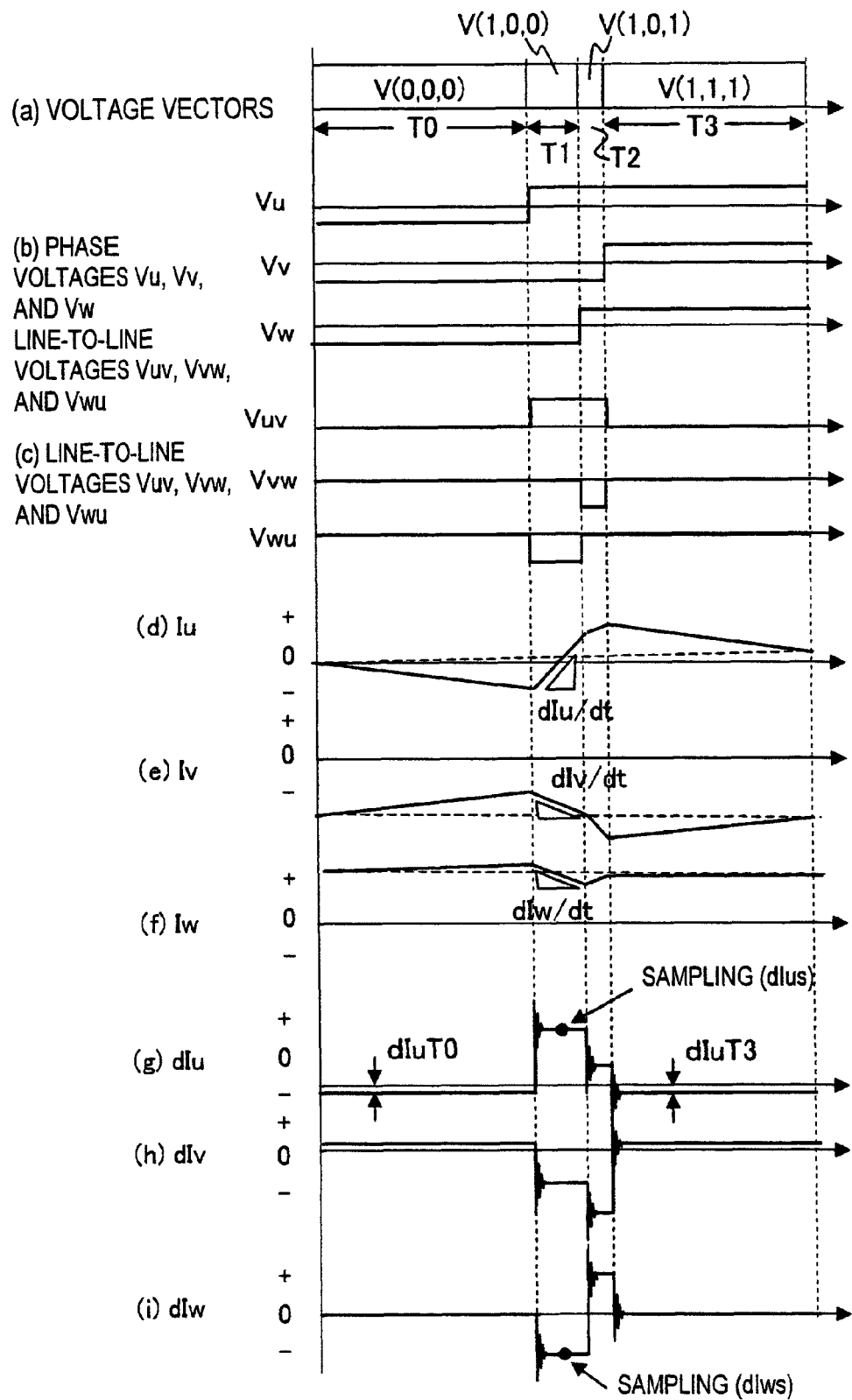
FIG. 9 is a chart showing waveforms of respective sections according to Embodiment 2 of the present invention.
Figure 10:
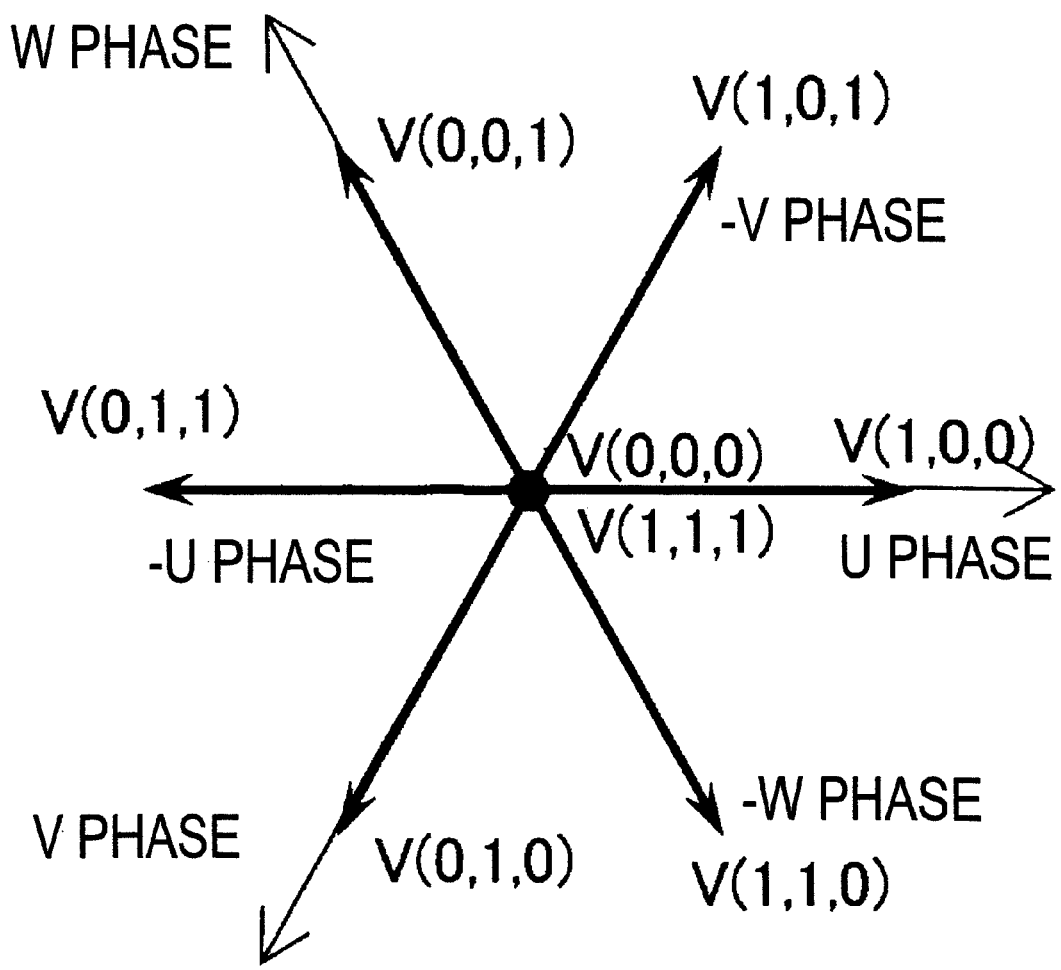
FIG. 10 is a diagram illustrating, by means of vectors, an output waveform of an inverter 3 according to Embodiment 2 of the present invention.

In the case where the induction motor 5 is driven at a low speed, an amplitude of a fundamental wave of a voltage applied to the induction motor is small. This is because a counter electromotive voltage of the induction motor 5 is proportional to the rotational speed, and this is based on the principle of a rotary machine. As a result of the reduction in the amplitude of the applied voltage, the PWM pulses of the inverter become extremely smaller. This state is shown in FIG. 9. FIG. 9 is a chart obtained by redrawing the PWM waveforms shown in FIG. 5, the currents at this time, and a part of the current change rates (the part in which the triangle wave carrier is in a decreasing direction) under the condition that the applied voltage is low.

In the output voltages (b) of the inverter, there are two patterns, that is, whether the device of each phase is turned on on the upper side or on the lower side, and there are eight switching patterns in total for the three phases. These patterns are represented by vectors in FIG. 10. Each vector expressed as V (x, y, z) represents a switching state of each phase. For example, V (1, 0, 0) represents a state in which the U phase is 1 (that is, a switch on the upper side is turned on) and the V phase and the W phase are 0 (a switch on the lower side is turned on). When this is applied to FIG. 9, this period starts from V (0, 0, 0), goes through V (1, 0, 0) and V (1, 0, 1), and ends with V (1, 1, 1). The line-to-line voltages at this time are as shown in (c) of FIG. 9, and it can be understood that pulse voltages are applied between the lines at the voltage vectors other than V (0, 0, 0) and V (1, 1, 1) (which are referred to as zero vectors).

In the case where the rotational speed is extremely low, output periods of the vectors other than these zero vectors become extremely short. In FIG. 9, the output period of V (1, 0, 0) is denoted by T1, and the output period of V (1, 0, 1) is denoted by T2. Under the condition that the number of revolutions is low, the counter electromotive voltage of the induction motor 3 is small, and the pulse voltage acts as an extremely large disturbance pulse. As shown in (d) to (f) of FIG. 9, the largest current changes appear during the pulse application period. The current change rates at this time are as shown in (g) to (i) of FIG. 9.

In order to perform sensorless control in an extremely low speed region, it is necessary to determine the current change rates. In this case, as is apparent from FIG. 9, the current change rates at the time of the pulse application are largest, and the sensitivity is high. Accordingly, the position estimation is possible at a high sensitivity by determining the current change rates during only this period. For example, in FIG. 9, the pulse width during the period T1 is longer than that during T2, and hence it is easier to determine the current change rates. In Embodiment 2, the control system is configured on the basis of such a principle.

In FIG. 6, on the basis of the magnitude relation between the three-phase voltage commands Vu*, Vv*, and Vw*, the application timing of a voltage vector (the vector other than zero vectors) having the largest width is calculated, and a trigger signal for performing a sample-and-hold process in accordance with the calculated timing is generated by the trigger generator 18. The current change rates are sampled and held by the sample-and-hold circuit 17 in response to the generated trigger signal. That is, sampling as shown in (g) and (i) of FIG. 9 is performed.

In the magnetic flux estimator 15B, a vector having a larger pulse width is selected by the vector selector 156 on the basis of the magnitude relation between the voltage commands Vu*, Vv*, and Vw*, and the voltage thereof is given to the dq converter 153. In the magnetic flux model calculator 152B, the magnetic flux estimation and the estimated calculation of the current change rates are performed only on a specific voltage vector.

The magnetic flux model calculator 152B performs the simulation similarly to the embodiment illustrated in FIG. 4, but one voltage vector is specified, and hence the calculation processing can be considerably simplified. The current estimate values Idce and Iqce are outputted from the Id map 1523a and the Iq map 1523b, respectively, and differences between Idce and Iqce and previously calculated initial values thereof (delay elements 1525a and 1525b) are taken, respectively, so that the current change rates dIdce and dIqce are obtained.

As described above, in Embodiment 2, the moment at which a voltage vector other than zero vectors is applied is sampled, whereby the magnetic flux position inside of the induction motor 5 is estimated and calculated. The number of sampling can be suppressed to one in a half cycle of the carrier, and hence it becomes possible to apply a general-purpose microcomputer.

Embodiment 3

Next, Embodiment 3 of the present invention is described.

In Embodiments 1 and 2, the control target is the induction motor, and in Embodiment 3, a permanent magnet synchronous motor (hereinafter, abbreviated as PM motor) is applied. The PM motor can realize downsizing and higher efficiency compared with the induction motor, and hence application purposes thereof are expected to be expanded hereafter.

Figure 11:
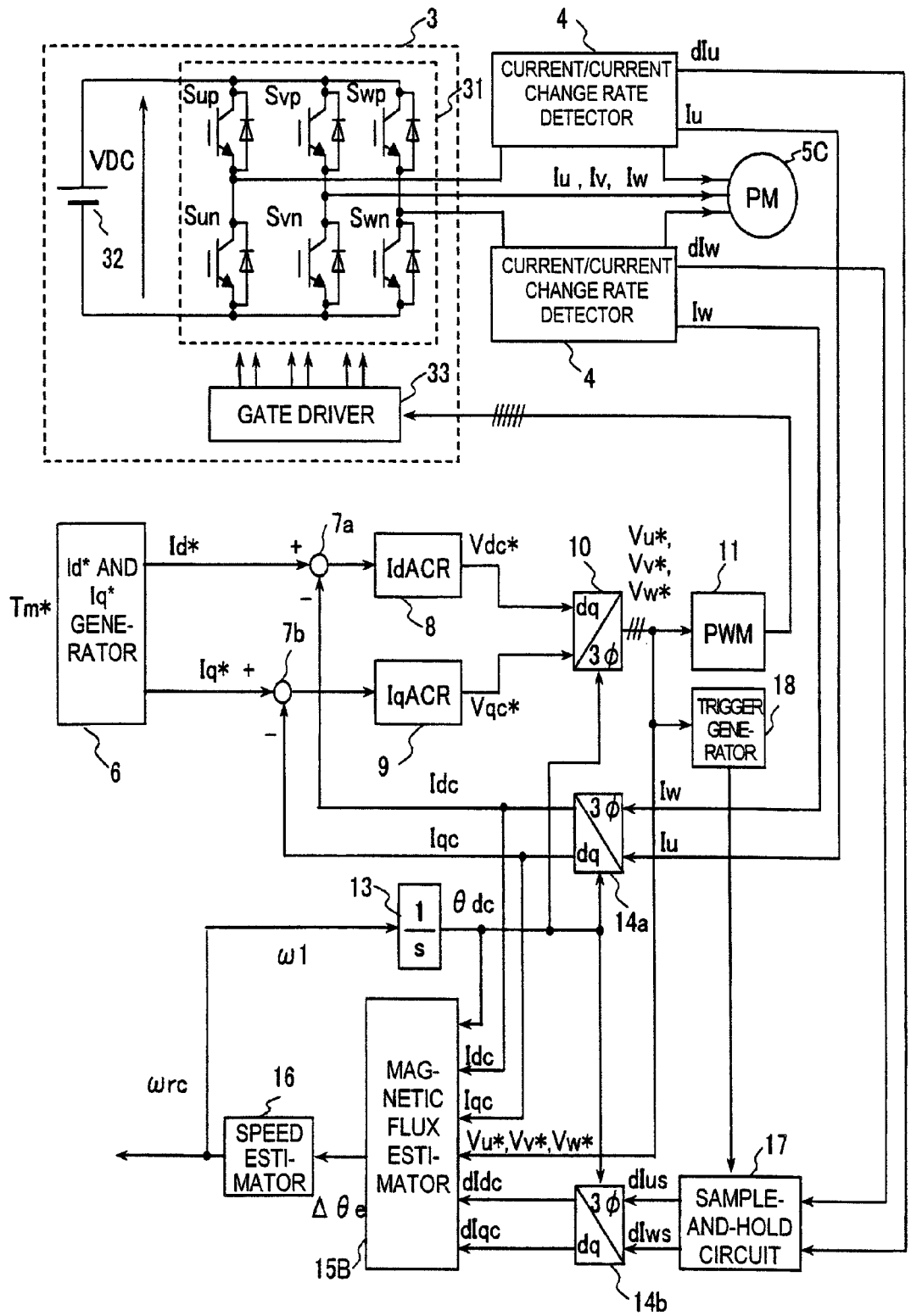
FIG. 11 is a block diagram illustrating a configuration of a drive device for an alternating current motor according to Embodiment 3 of the present invention.

FIG. 11 is a configuration diagram according to Embodiment 3, which is illustrated on the basis of Embodiment 2 (FIG. 6). A controller 2C is substantially the same as the controller 2B in FIG. 6, and no change is made thereon except the slip calculator 12 is removed. In addition, the electric motor is replaced with a PM motor 5C.

In the PM motor, the drive frequency ω1 and the frequency ωrc of the number of revolutions are always synchronized with each other, and hence the slip frequency does not need to be added, so that the control configuration is more simplified. That is, a drive system of the PM motor can be configured only by removing the slip calculator 12. On this occasion, it is necessary to modify the Id map and the Iq map included in the magnetic flux model calculator 152 or 152B so as to be suited to the PM motor. Conversely, the driving of the PM motor is possible only by this modification.

Embodiment 4

Next, Embodiment 4 of the present invention is described.

In Embodiment 2, a description is given of the method in which the magnetic flux position can be estimated by performing sampling only once in a half cycle of the triangle wave carrier. In Embodiment 4, the sampling is performed twice in a half cycle of the carrier.

Voltage vectors other than zero vectors are outputted always twice in normal PWM. For example, as shown in FIG. 9, two vectors of V (1, 0, 0) and V (1, 0, 1) are outputted within a half cycle of the carrier. The use of these two voltage vectors enables detection with a higher sensitivity. The higher sensitivity directly leads to an increase in accuracy, and hence vector control closer to an ideal level can be realized in a sensorless manner.

The principle of the above contents is described with reference to FIGS. 12 to 16.

Figure 12:
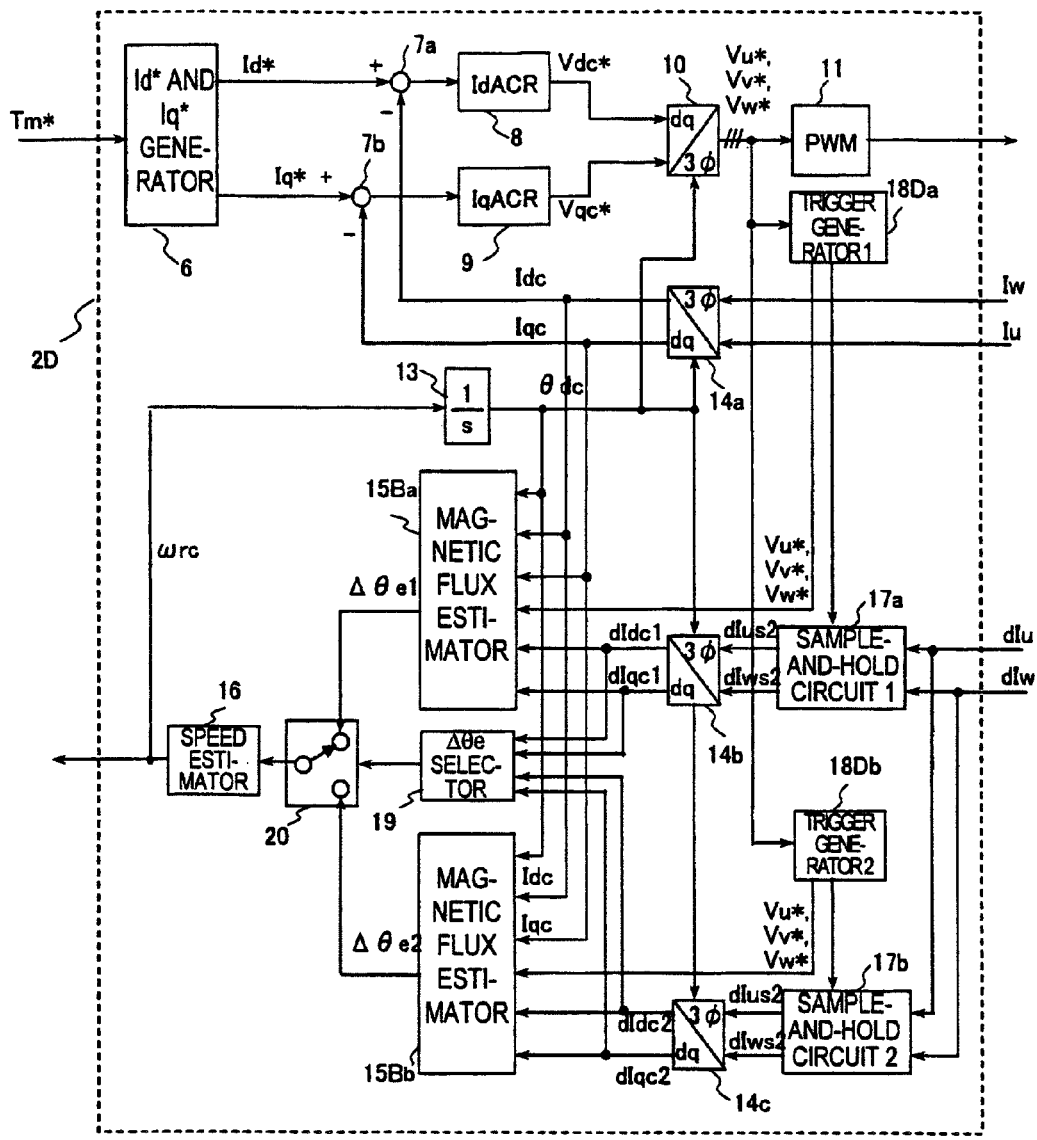
FIG. 12 is a block diagram illustrating a configuration of a drive device for an alternating current motor according to Embodiment 4 of the present invention.
Figure 13:
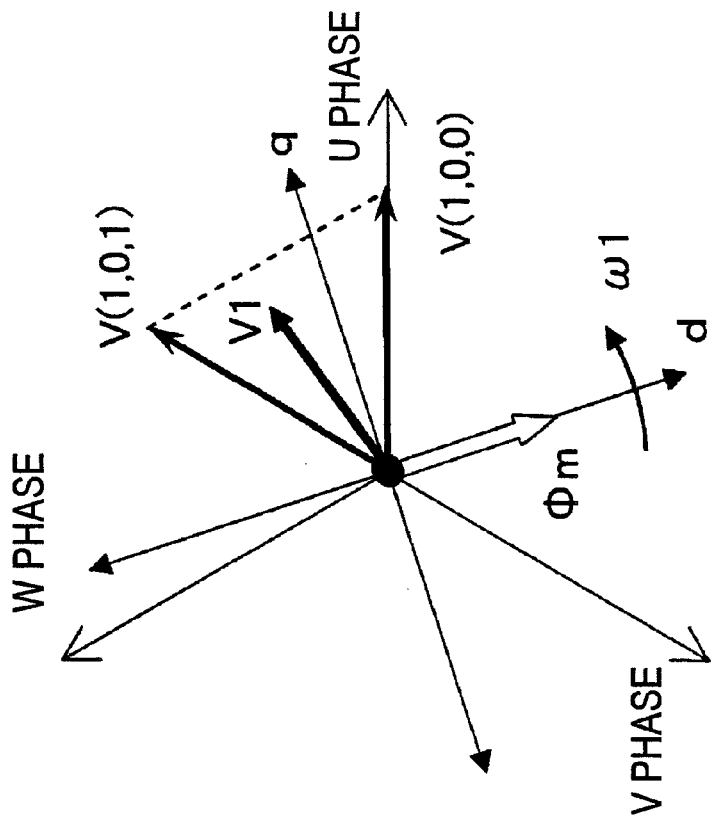
FIG. 13A is a diagram illustrating voltage vectors according to Embodiment 4 of the present invention.
FIG. 13B is another diagram illustrating the voltage vectors according to Embodiment 4 of the present invention.
Figure 13:
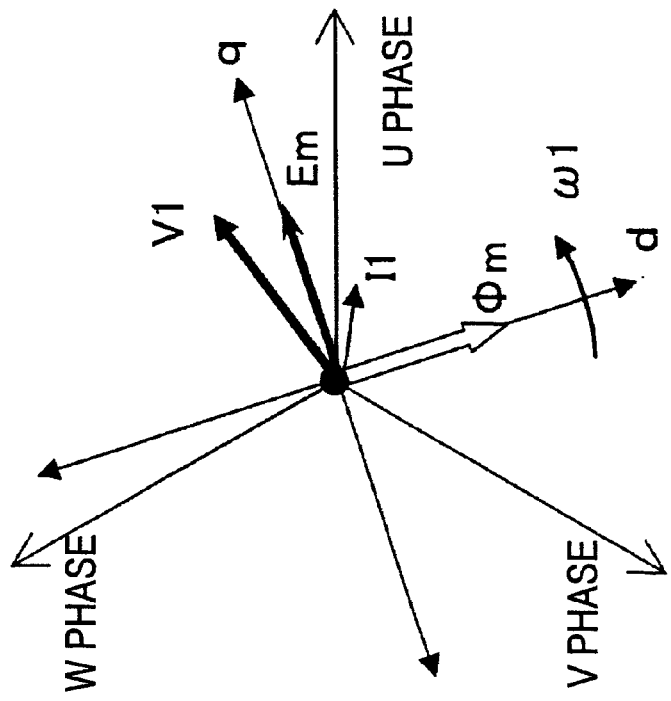
Figure 14:
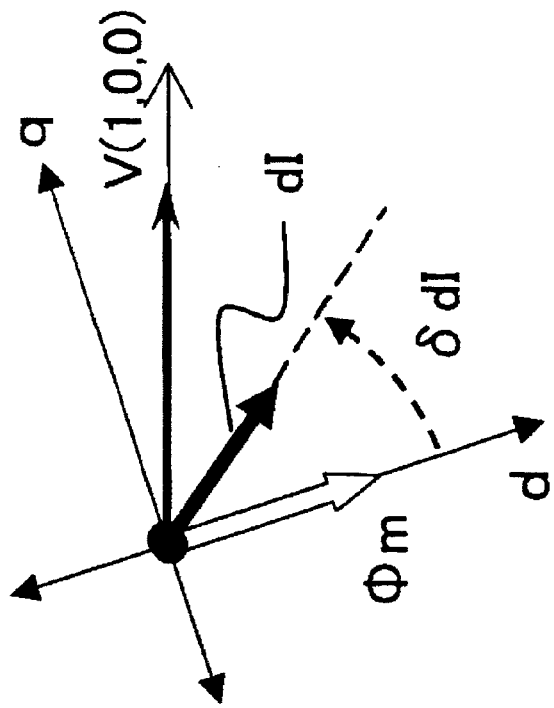
FIG. 14A is a diagram illustrating a relation between a voltage vector V (1, 0, 0) and a vector of a current change rate $\delta dI$ according to Embodiment 4 of the present invention.
FIG. 14B is another diagram illustrating the relation between the voltage vector V (1, 0, 0) and the vector of the current change rate $\delta dI$ according to Embodiment 4 of the present invention.
Figure 14:
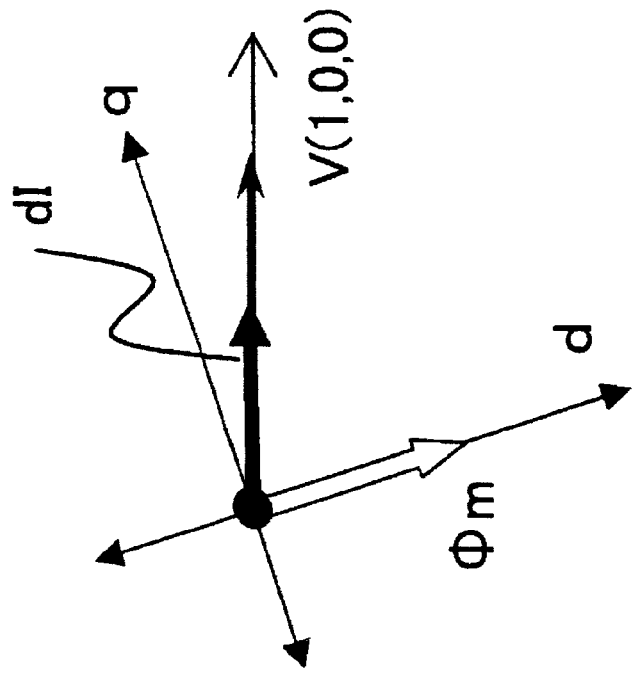
Figure 15:
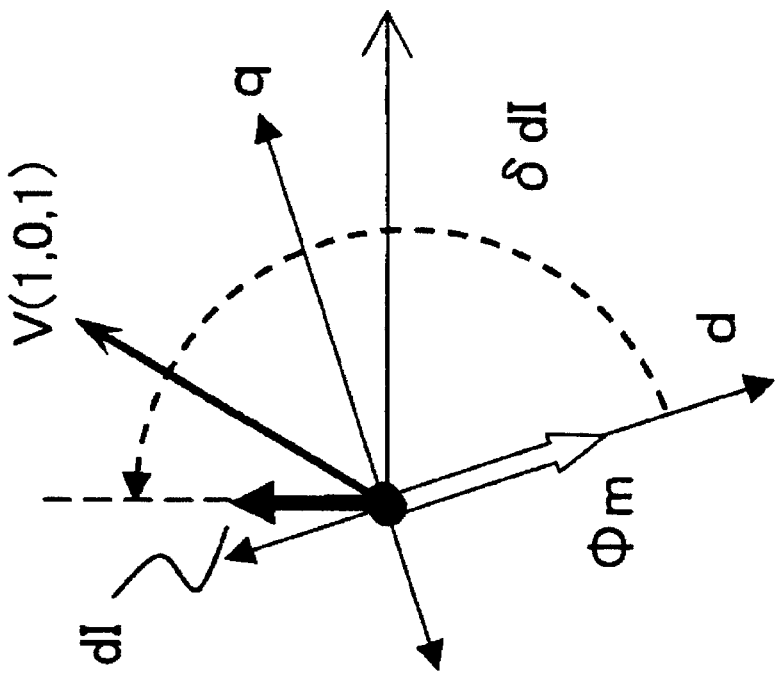
FIG. 15A is a diagram illustrating a relation between a voltage vector V (1, 0, 1) and the vector of the current change rate $\delta dI$ according to Embodiment 4 of the present invention.
FIG. 15B is another diagram illustrating the relation between the voltage vector V (1, 0, 1) and the vector of the current change rate $\delta dI$ according to Embodiment 4 of the present invention.
Figure 15:
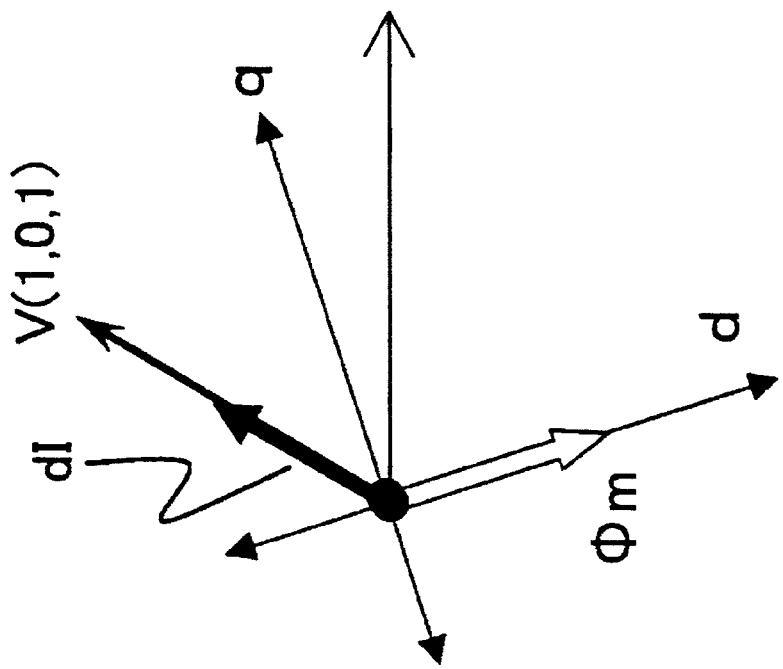
Figure 16:
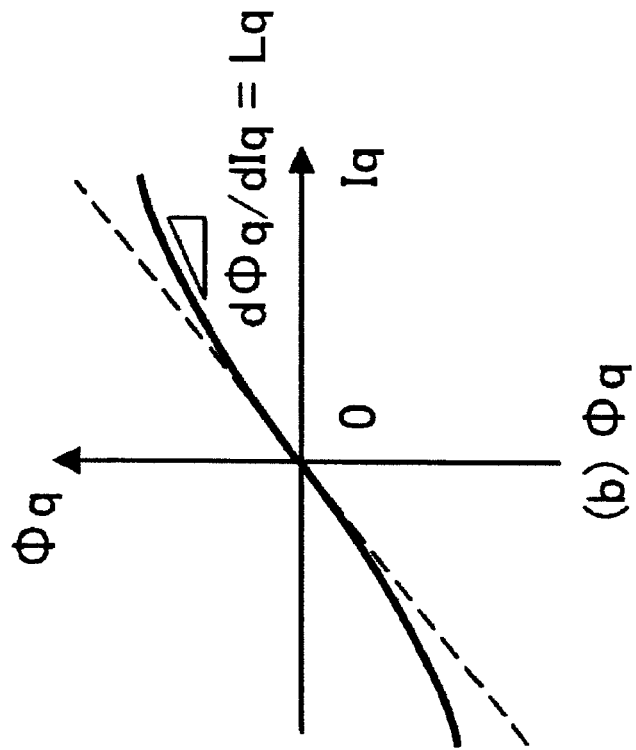
FIG. 16A is an explanatory diagram illustrating a magnetic saturation phenomenon according to Embodiment 4 of the present invention.
FIG. 16B is another explanatory diagram illustrating the magnetic saturation phenomenon according to Embodiment 4 of the present invention.
Figure 16:
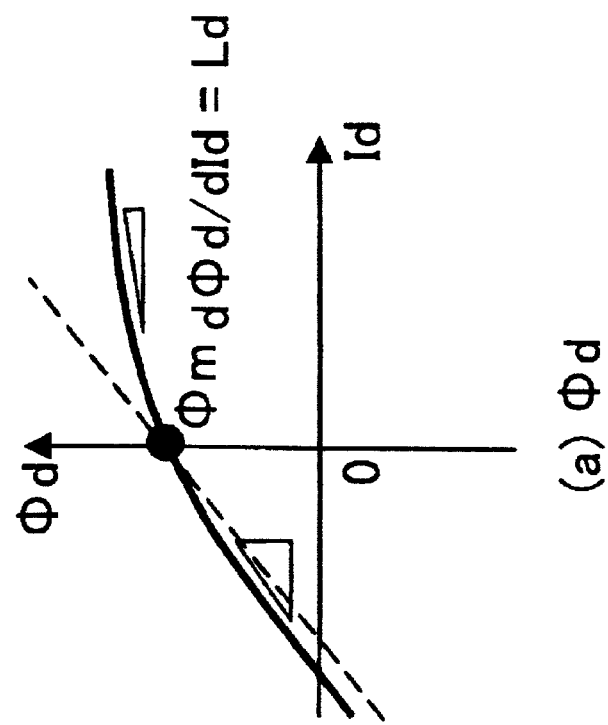

FIG. 12 is a block configuration diagram illustrating a controller 2D which is a characteristic feature of Embodiment 4. Embodiment 4 is implemented by adopting the controller 2D instead of the controller 2C in FIG. 11. It should be noted that, if the slip calculator 12 is added, Embodiment 4 can be applied to the driving of the induction motor similarly to Embodiments 1 and 2.

In FIG. 12, the blocks denoted by part numbers 6 to 14 and 16 are identical with those denoted by the same numbers illustrated in FIG. 1 or FIG. 11. A characteristic feature of the present embodiment resides in that there are two calculation routes for Δθe. One of the calculation routes is configured by a trigger generator 18Da, a sample-and-hold circuit 17a, a dq converter 14b, and a magnetic flux estimator 15Ba. In this route, in response to a trigger signal from the trigger generator 18Da, the sample-and-hold circuit 17a samples and holds the current change rates dIu and dIw, the dq converter 14b subjects the sampled and held values to coordinate conversion, and the magnetic flux estimator 15Ba takes in the converted current change rates on the d- and q-axes, to thereby calculate Δθe1. Another calculation route similar to this route exists, and is configured by a trigger generator 18Db, a sample-and-hold circuit 17b, a dq converter 14c, and a magnetic flux estimator 15Bb, which serve to calculate Δθe2.

A difference between the two routes resides in that a current change rate when which voltage vector is applied is to be utilized. As described above, there are two voltage vectors other than zero vectors, and the current change rates are detected when the two voltage vectors are applied. A newly added Δθe selector 19 compares the magnitudes of the current change rates on the d- and q-axes with each other, and determines on the basis of which change rate the calculation is to be performed. The switching therebetween is made by a switch 20.

The Δθe selector 19 performs the following calculation, to thereby compare the magnitudes of the current change rates with each other.

$$dI1\_amp = \sqrt{(dIdc1^2 + dIqc1^2)} \qquad \text{[Expression 1]}$$

$$dI2\_amp = \sqrt{(dIdc2^2 + dIqc2^2)} \qquad \text{[Expression 2]}$$

Results obtained from Expression 1 and Expression 2 given above are compared with each other, and Δθe having a larger value is to be used. The large magnitude of the current change rate means that the sensitivity is accordingly high, and means that an error in estimated calculation is less likely to occur. The principle thereof is described further in detail.

In FIG. 13A, the fixed system of coordinates of three phases of U, V, and W and the dq coordinates (rotating system of coordinates) are illustrated together. If it is assumed that a magnetic flux Φm is located on the d-axis, a counter electromotive voltage Em exists in a phase which is shifted by 90 degrees with respect to Φm, that is, on the q-axis. A phase of a current I1 and a phase of a voltage V1 are assumed as illustrated in FIG. 13A. With respect to V1, a voltage vector which is outputted from the inverter through PWM is, for example, as illustrated in FIG. 13B. If V1 exists in a region surrounded by three points of a zero vector and voltage vectors V (1, 0, 0) and V (1, 0, 1), the switching is made by using these three vectors.

FIGS. 14A and 14B are diagrams each illustrating vectors at the moment at which the voltage vector V (1, 0, 0) is applied. If it is assumed that an inductance of the electric motor is completely uniform, a change in current occurs in the direction of the applied voltage vector (FIG. 14A). In this case, the position estimation is impossible. In actuality, in the phase in which the magnetic flux Φm exists, the inductance is reduced by magnetic saturation, and hence the vector dI of the current change rate is generated so as to be displaced in a direction close to Φm as illustrated in FIG. 14B. It becomes possible to estimate the magnetic flux position on the basis of the degree of such displacement.

In the same manner, FIGS. 15A and 15B each illustrate a state at the moment at which another voltage vector V (1, 0, 1) is applied. At this time, the direction of the vector is different from V (1, 0, 0), and hence a behavior of the current change rate is also different therefrom. Also in this case, if the inductance is uniform, dI should be generated only in the same direction as V (1, 0, 1), but in actuality, both of the magnitude and the direction are different from those of FIGS. 14A and 14B due to an influence of magnetic saturation.

It should be noted that the magnetic saturation means that a d-axis magnetic flux of the d-axis current and a q-axis magnetic flux of the q-axis current become nonlinear as illustrated in FIGS. 16A and 16B. More specifically, there may be interference between d and q, and hence it can be said that the inductance is not uniform. Accordingly, the two voltage vectors have different relations with the magnetic flux position, so that the current change rates of the two voltage vectors exhibit behaviors different from each other.

In order to determine which of these two current change rates is to be used, the magnitudes of the current change rates can serve as a measure therefor. As the current change rate is larger, the accuracy itself is more improved, and hence an error in calculation is supposed to be less likely to occur.

As described above, the use of Embodiment 4 enables position estimation with a higher accuracy.

Embodiment 5

Next, Embodiment 5 is described with reference to FIGS. 17 to 19.

Figure 17A:
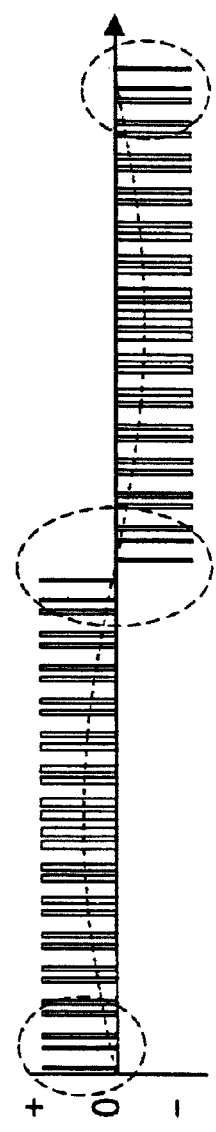
FIG. 17A is a chart showing a line-to-line voltage waveform according to Embodiment 5 of the present invention.

In the PWM by triangle wave comparison, the line-to-line voltage waveform is a waveform as shown in FIG. 17A. That is, a PWM pulse train always appears on the positive side in a positive half cycle of fundamental wave components, and the PWM pulse train appears on the negative side in a half cycle in which the fundamental wave is negative. This state contains the smallest amount of harmonic wave, and thus corresponds to an ideal condition in terms of noise and loss caused by the harmonic wave.

According to the present invention, it is necessary to read the current change rates at the moment at which a pulse is applied to the line-to-line voltage. However, from the point of view of implementation, if a pulse width is extremely small, sampling itself becomes difficult. At a rising edge of the pulse, it is not necessarily possible to perform the sampling due to not a little influence of ringing, dead time, or the like.

Figure 18:
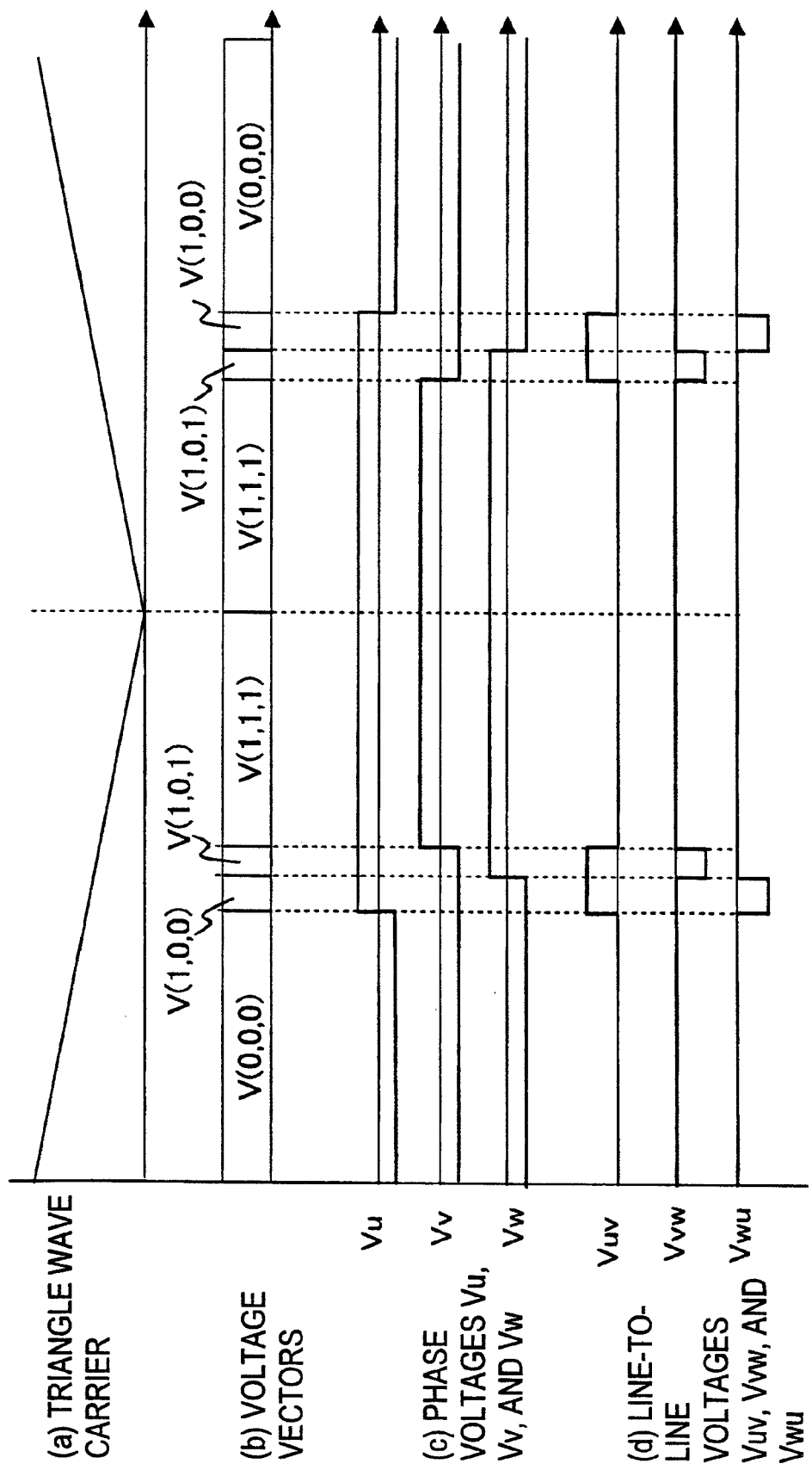
FIG. 18 is a chart showing a PWM waveform according to Embodiment 5 of the present invention.
Figure 19:
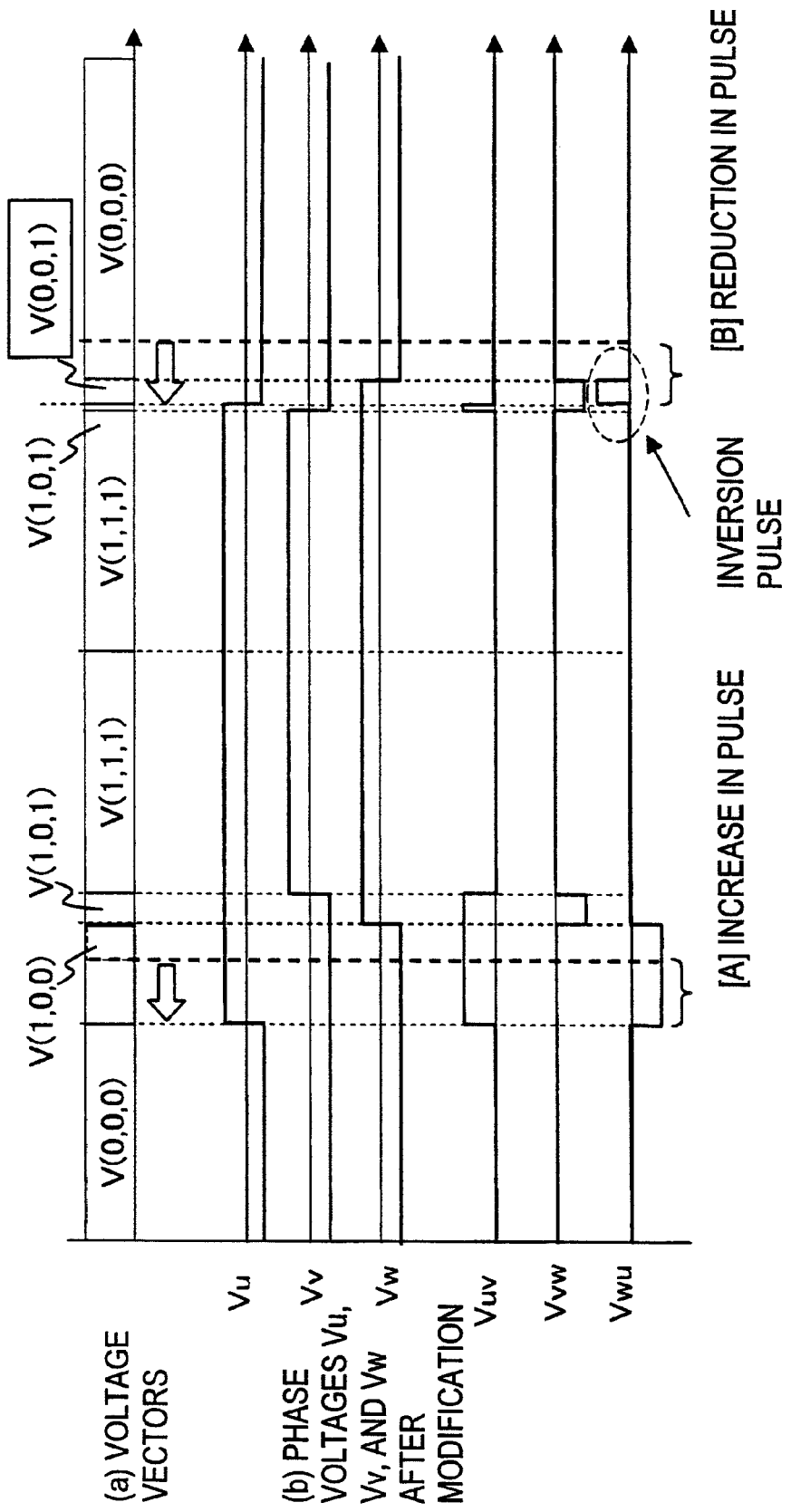
FIG. 19 is a chart showing a waveform when the PWM waveform according to Embodiment 5 of the present invention is corrected.

Conventionally, pulses are generated as shown in FIG. 18, and on the other hand, a pulse shift is performed herein as shown in FIG. 19 in order to eliminate a pulse having a small width. In FIG. 19, the period of V (1, 0, 0) is extended compared with the pulses in FIG. 18, to thereby forcibly increase the pulse width (a portion [A] of FIG. 19). Instead, a period corresponding to the increased pulse is reduced in the next period (a portion [B] of FIG. 19). These corrections can be easily made by adding a correction voltage to a voltage command so that the pulse width becomes equal to or larger than a predetermined value, and subtracting the corresponding value in the next period. In FIG. 19, compared with FIG. 18, the rising of the pulse of the U phase is put forward, and then the falling thereof is put forward in the next period. In this way, both of the rising timing and the falling timing of the pulse are modified, whereby the fundamental wave components of the applied voltage are maintained. However, as a result of this modification, there is a large influence on the pulse of Vwu. An inversion pulse, which does not appear before the corrections, is generated.

Figure 17B:
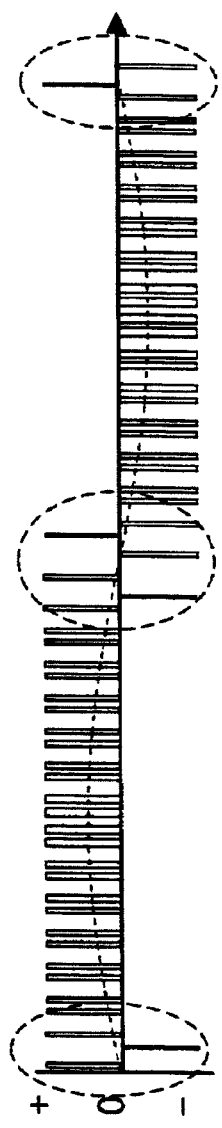
FIG. 17B is another chart showing the line-to-line voltage waveform according to Embodiment 5 of the present invention.
Figure 29:
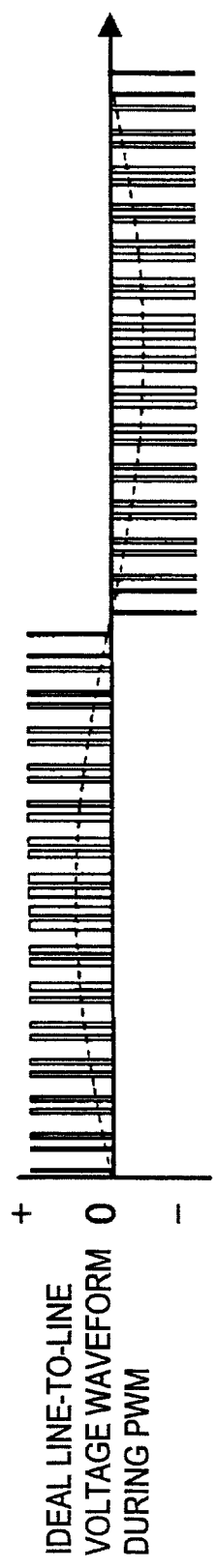
FIG. 29A is a chart showing a waveform of an ideal line-to-line voltage according to a conventional example.
FIG. 29B is a chart showing a waveform of a line-to-line voltage when application of a harmonic wave is performed according to the conventional example.
Figure 29:
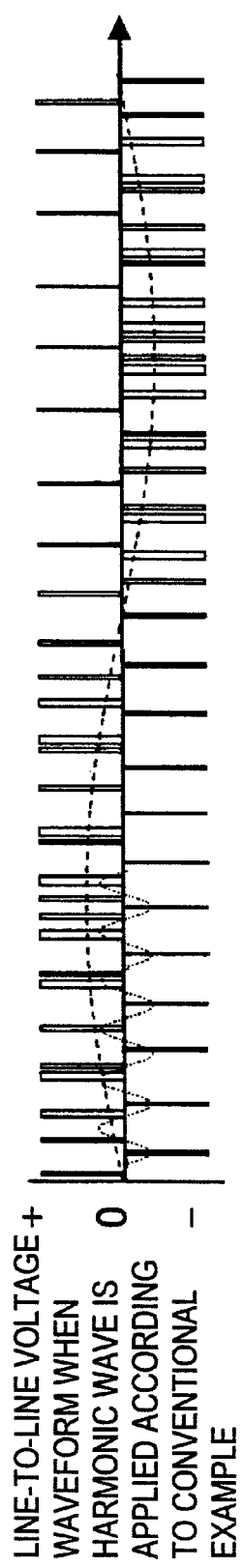
Figure 30:
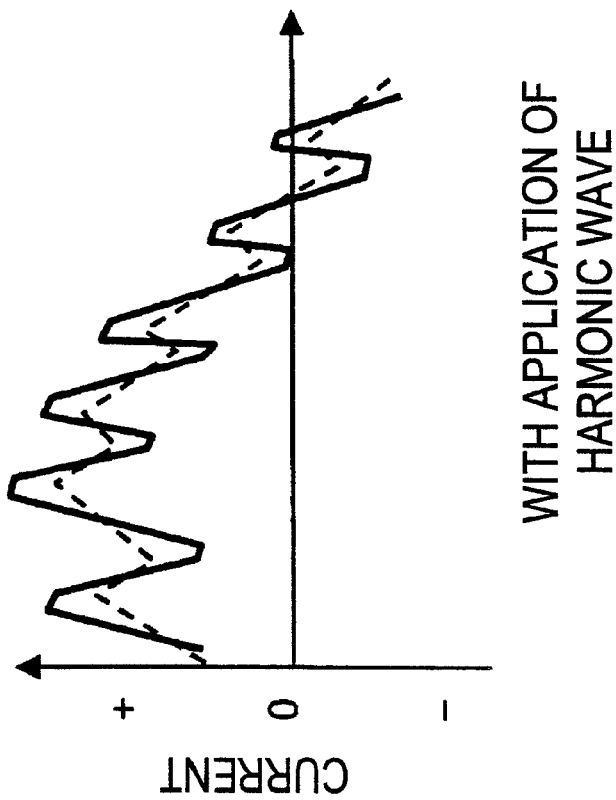
FIG. 30A is a chart showing a current waveform when the application of a harmonic wave is not performed according to the conventional example.
FIG. 30B is a chart showing a current waveform when the application of a harmonic wave is performed according to the conventional example.
Figure 30:
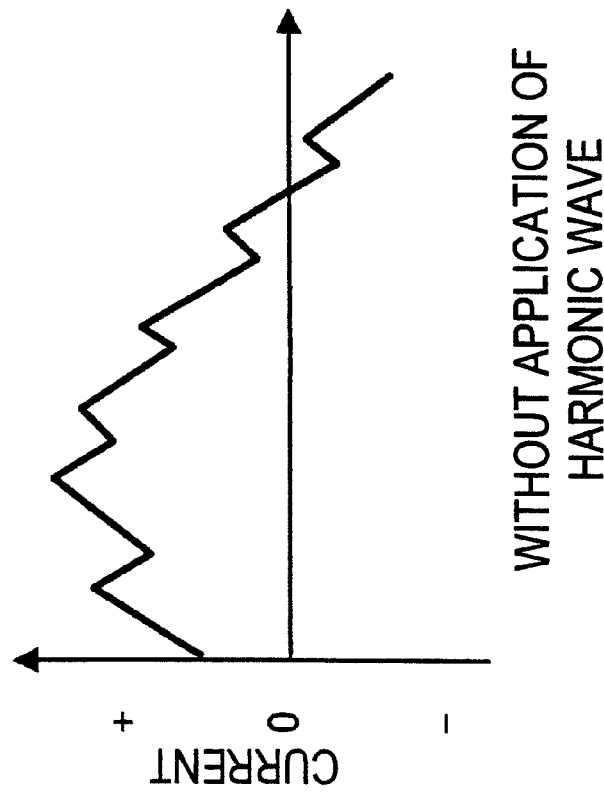

As a result, a pulse which is partially inverted as shown in FIG. 17B is outputted. However, the inversion pulse appears only partially, and compared with the conventional method in which a harmonic wave is always superimposed (FIG. 29B), the amount of generated harmonic wave is considerably smaller.

As described above, according to Embodiment 5, even under a pulse condition in which the detection of the current change rates is difficult, the detection of the current change rates becomes possible with almost no increase in harmonic components, and the position estimation is realized.

Embodiment 6

Next, Embodiment 6 of the present invention is described.

In the embodiments described above, the magnetic flux estimator 15 or 15B calculates the magnetic flux inside of the alternating current motor, and this calculation requires a large amount of processing time (calculation load). Embodiment 6 is intended to reduce such calculation processing.

Figure 20:
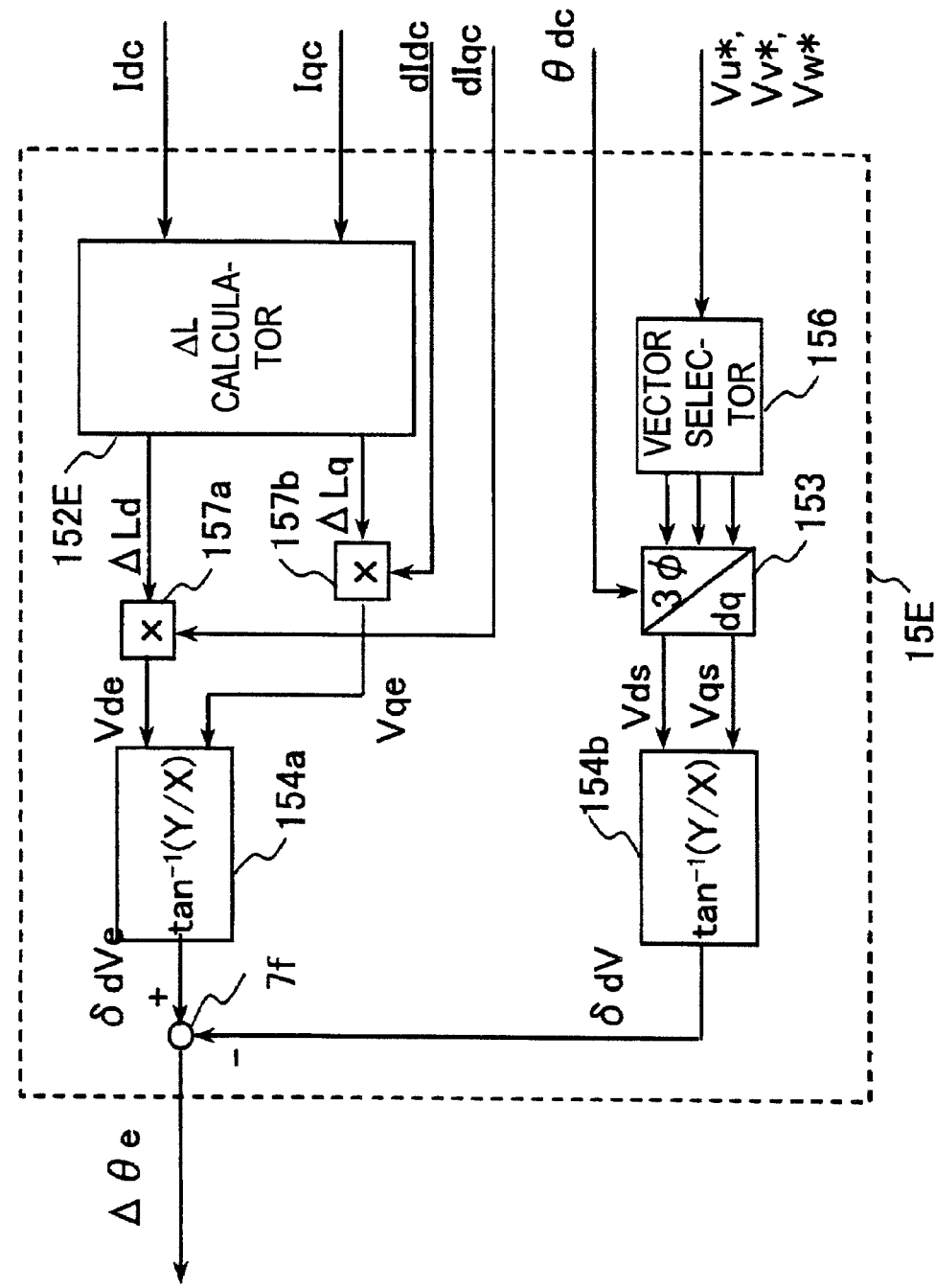
FIG. 20 is a diagram illustrating a detail of an electromotive voltage estimator 15E according to Embodiment 6 of the present invention.

FIG. 20 is a configuration diagram illustrating an electromotive voltage estimator 15E as a replacement of the magnetic flux estimators 15 and 15B described above. Embodiment 6 is implemented by adopting, in Embodiment 2 and the subsequent embodiments, the electromotive voltage estimator 15E instead of the magnetic flux estimator. In FIG. 20, components denoted by part numbers 7f, 153, 154a, 154b, and 156 are identical with those denoted by the same numbers in the embodiments described above.

Figure 21:
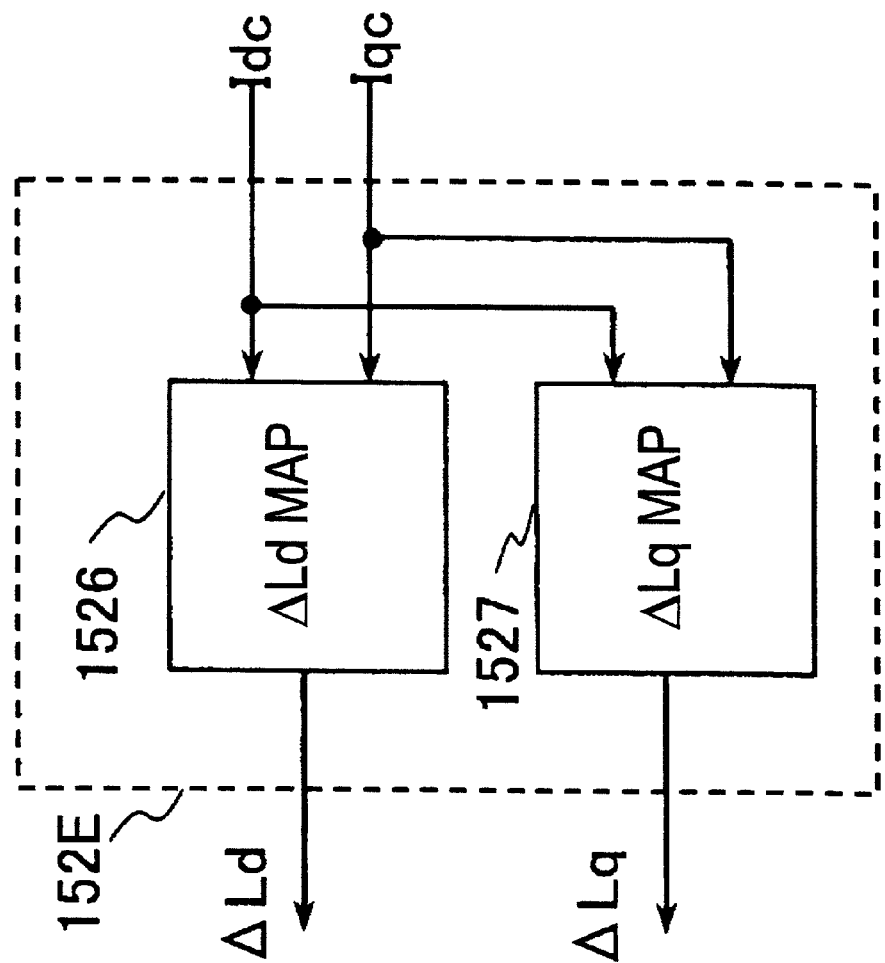
FIG. 21 is a diagram illustrating a detail of a $\Delta L$ calculator 152E according to Embodiment 6 of the present invention.

In the electromotive voltage estimator 15E of FIG. 20, a ΔL calculator 152E and multipliers 157a and 157b are added. The ΔL calculator 152E calculates a slope of a magnetic flux change with respect to each current change, on the basis of Idc and Iqc. This corresponds to obtaining $d\Phi d/dI$ and $d\Phi q/dIq$ in FIGS. 16A and 16B (an inductance corresponding to the "slope" as described above is generally referred to as dynamic inductance). For this calculation, a mathematical expression model may be used, or as illustrated in FIG. 21, data table maps (ΔLd map 1526 and ΔLq map 1527) may be created directly from results of magnetic field analysis of the electric motor.

In the case where there is interference between the d- and q-axes, the model becomes more complicated, but mapping is possible in any case.

The dynamic inductance obtained by the ΔL calculator 152E and the detected current change rates are multiplied by each other by the multipliers 157a and 157b, respectively, whereby an electromotive voltage corresponding to the inductance can be calculated. The calculated electromotive voltage should coincide with a pulse voltage applied by the inverter, in a low speed region in which the line-to-line voltage exhibits a narrow pulse pattern. A phase δdVe thereof is calculated from the electromotive voltage thus obtained.

Meanwhile, a voltage vector which is actually applied to the inverter is selected by the vector selector 156, and a phase angle δdV is obtained after dq conversion. The deviation between δdV and δdVe is caused by the position displacement of the magnetic flux, and hence the magnetic flux position inside of the controller can be made coincident with an actual magnetic flux position of the electric motor by controlling this displacement to be zero.

Accordingly, in Embodiment 6, the reference to the tables and the multiplication are performed as the calculation processing, whereby it becomes possible to perform the position estimation at a low speed with extremely simple calculation processing.

Embodiment 7

Next, Embodiment 7 of the present invention is described with reference to FIG. 22.

In the embodiments described above, a description is given of only the detection sampling of the current change rate, but sampling of a current value itself also largely affects the estimation accuracy of the magnetic flux position.

In order to perform the magnetic flux estimation or the electromotive voltage estimation, not only the current change rate but also information on the current value itself is required. In terms of improvement in estimation accuracy, it is preferable to detect this information and the current change rate as simultaneously as possible. FIG. 22 illustrates a controller 2F which realizes the above-mentioned condition.

Figure 22:
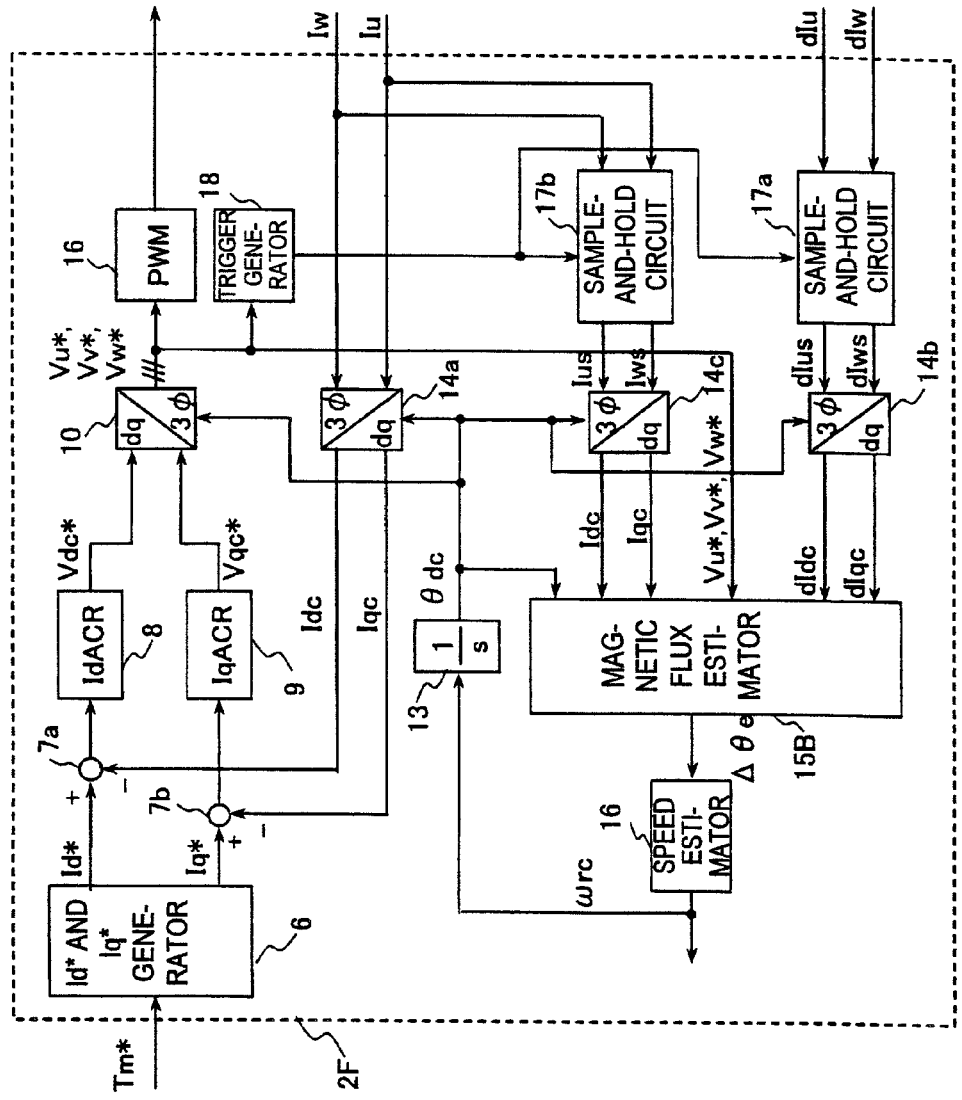
FIG. 22 is a diagram illustrating a detail of a controller 2F according to Embodiment 7 of the present invention.

In FIG. 22, the respective parts are identical with those denoted by the same numbers in the embodiments described above. FIG. 22 has the configuration closest to that of FIG. 11 according to Embodiment 3. In FIG. 22, the sample-and-hold circuit 17b is added also for the current detection values Iu and Iw, and the sampling thereof is performed at the same timing as that of the sample-and-hold process of the current change rates, in response to the output from the trigger generator 18. As a result, in the calculation by the magnetic flux estimator, the currents and the current change rates which are sampled at the same timing are used. That is, the synchronism between the current values and the current change rates is established, which makes it possible to realize the estimated calculation with a higher accuracy.

Embodiment 8

Next, Embodiment 8 of the present invention is described with reference to FIG. 23.

In the embodiments described above, with regard to the current/current change rate detector 4, the detector illustrated in FIG. 2 is applied, but it is also possible to detect the current change rates by means of another detector.

Figure 23:
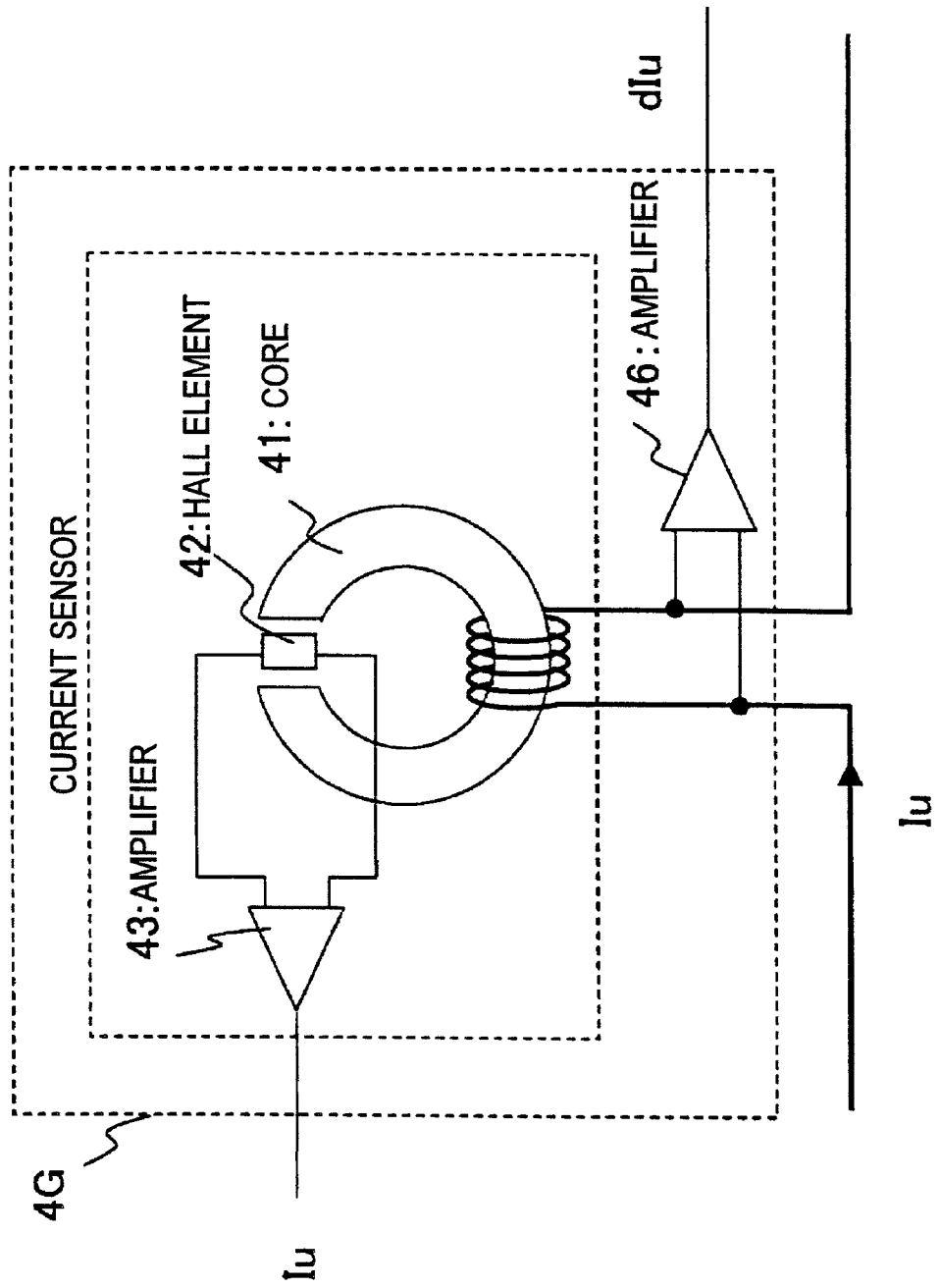
FIG. 23 is a diagram illustrating a configuration of a current/current change rate detector according to Embodiment 8 of the present invention.

FIG. 23 illustrates a circuit which is configured by providing the normal current sensor including the core member 41, the Hall element 42, and the amplifier 43 with a function of measuring a voltage at a terminal portion thereof, the measured voltage being used as the current change rate. An inductance component exists in the original current sensor, and hence the utilization of the terminal voltage makes it possible to directly detect the current change rate. A part required for detection is only an amplifier 46. It should be noted that the amplifier 46 needs to output an input signal in an isolated state. However, the adoption of the circuit illustrated in FIG. 23 can eliminate the need to provide the core member 41 with the auxiliary winding.

Embodiment 9

Next, Embodiment 9 of the present invention is described with reference to FIG. 24.

Figure 24:
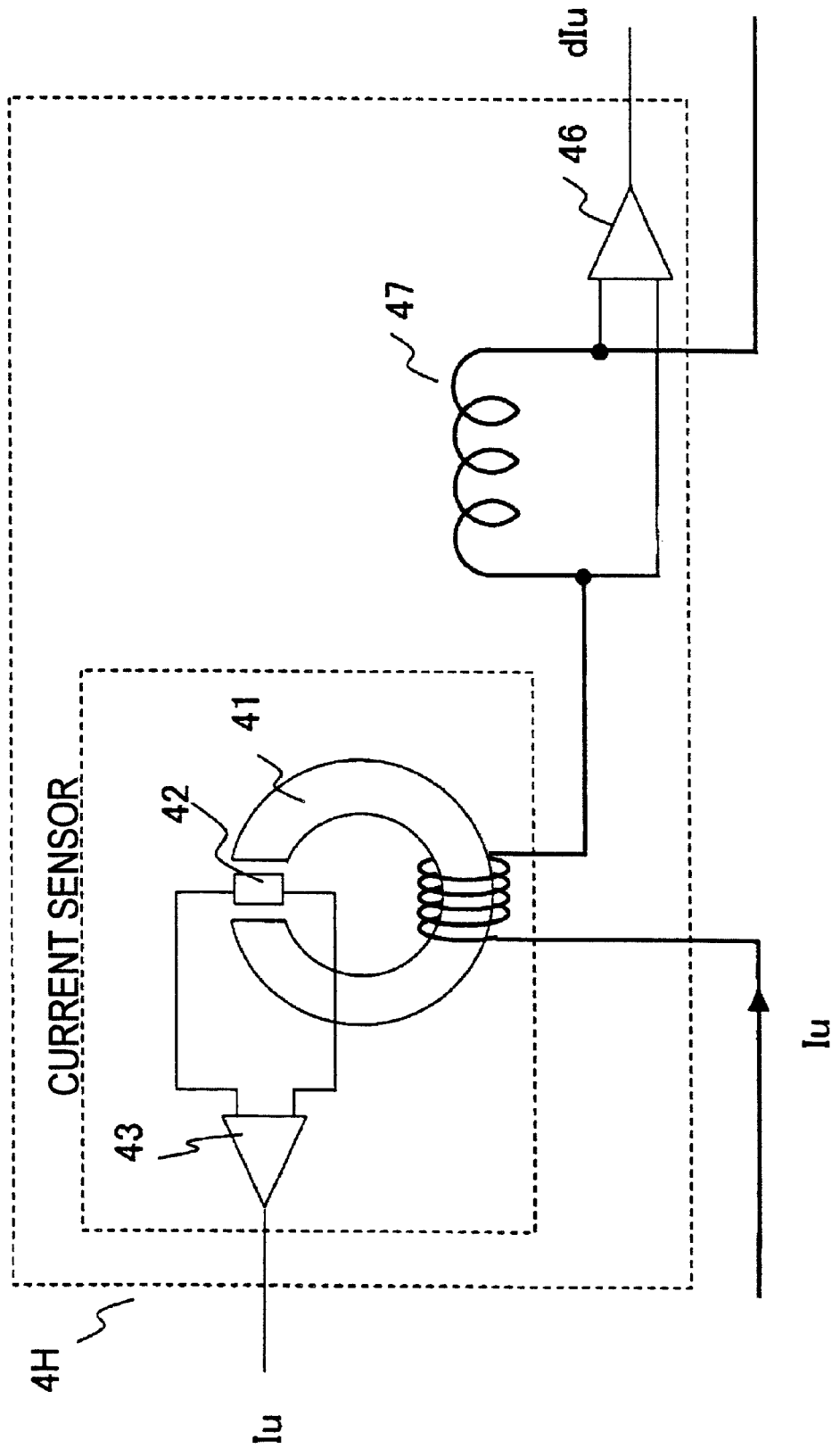
FIG. 24 is a diagram illustrating a configuration of a current/current change rate detector according to Embodiment 9 of the present invention.

FIG. 24 illustrates a circuit configuration in which an inductance is connected in series with the normal current sensor, and the current change rate is detected from an electromotive voltage between both ends thereof. An inductance 47 makes it possible to select the terminal voltage as desired. In order to detect the current change rate at a higher sensitivity, it is more advisable to provide an inductance separately. In this way, the adoption of the circuit configuration illustrated in FIG. 24 makes it possible to set a higher detection sensitivity for the current change rate in the embodiments described above.

Embodiment 10

Next, Embodiment 10 of the present invention is described with reference to FIG. 25.

Figure 25:
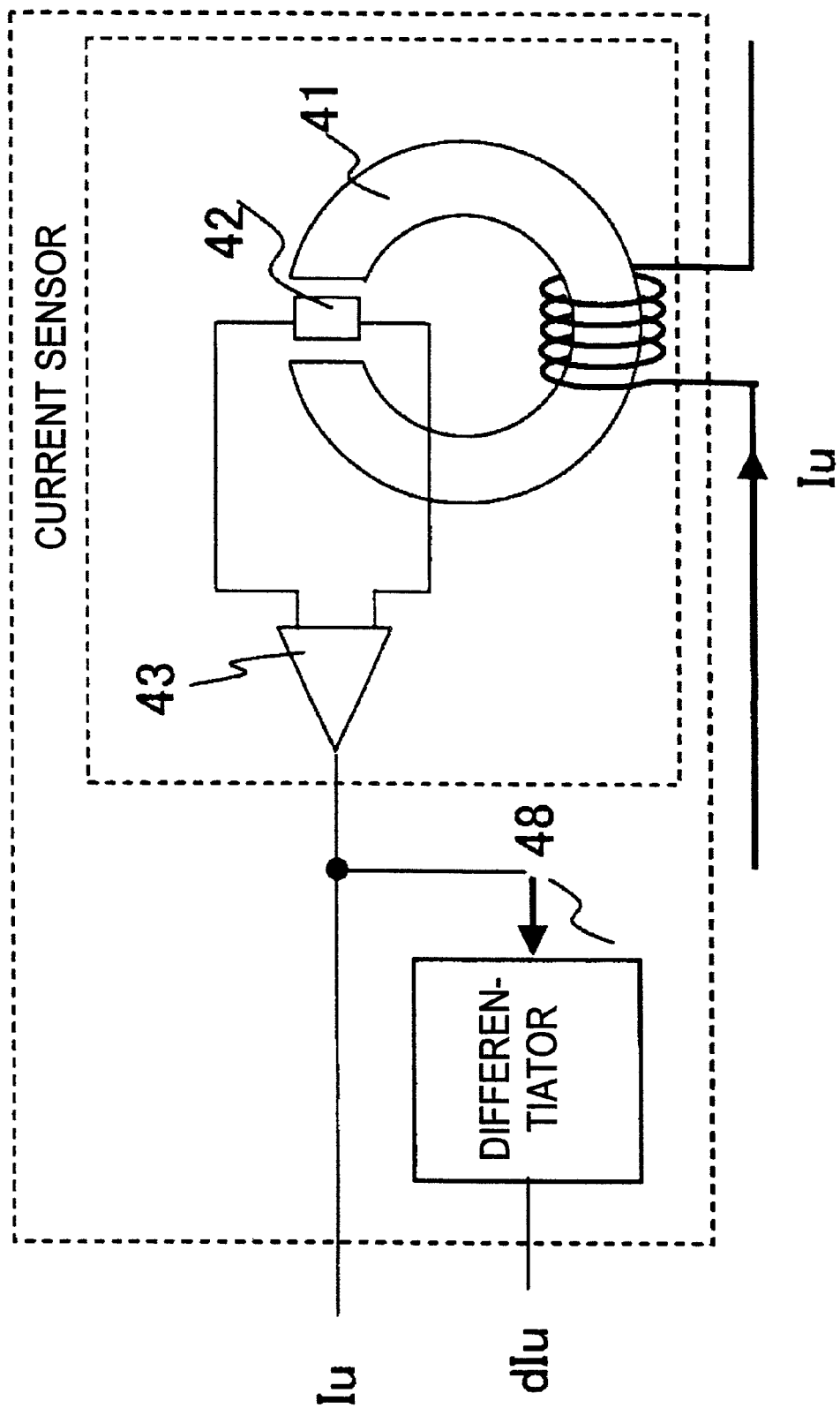
FIG. 25 is a diagram illustrating a configuration of a current/current change rate detector according to Embodiment 10 of the present invention.

FIG. 25 illustrates a circuit configuration in which the normal current sensor is provided with a differentiator 48, to thereby calculate the current change rate. As has already been described in the above, it is difficult to implement differential operation on a circuit, but along with the recent progress in semiconductor technology, high-speed A/D conversion and high-speed calculation processing using a gate array are possible. In a high-capacity motor drive system, the ratio of sensor costs to the entire system is small, and hence it is possible to introduce a slightly expensive calculator. For example, if an AD converter which serves as a measuring instrument and is capable of sampling at several tens of MHz is used for configuring a digital part, the present embodiment can be implemented. Owing to the digitalization, a change over time becomes less influential, and it becomes possible to realize the detection of the current change rate with a higher reliability, with the result that sensorless control with a high position accuracy can be realized.

Embodiment 11

Next, Embodiment 11 of the present invention is described with reference to FIGS. 26 and 27.

In the embodiments described above, it is assumed that the current change rate is detected directly by the detector, but if only the accuracy of the analog circuit can be secured, it is possible to calculate the current change rate by performing sampling twice.

Figure 26:
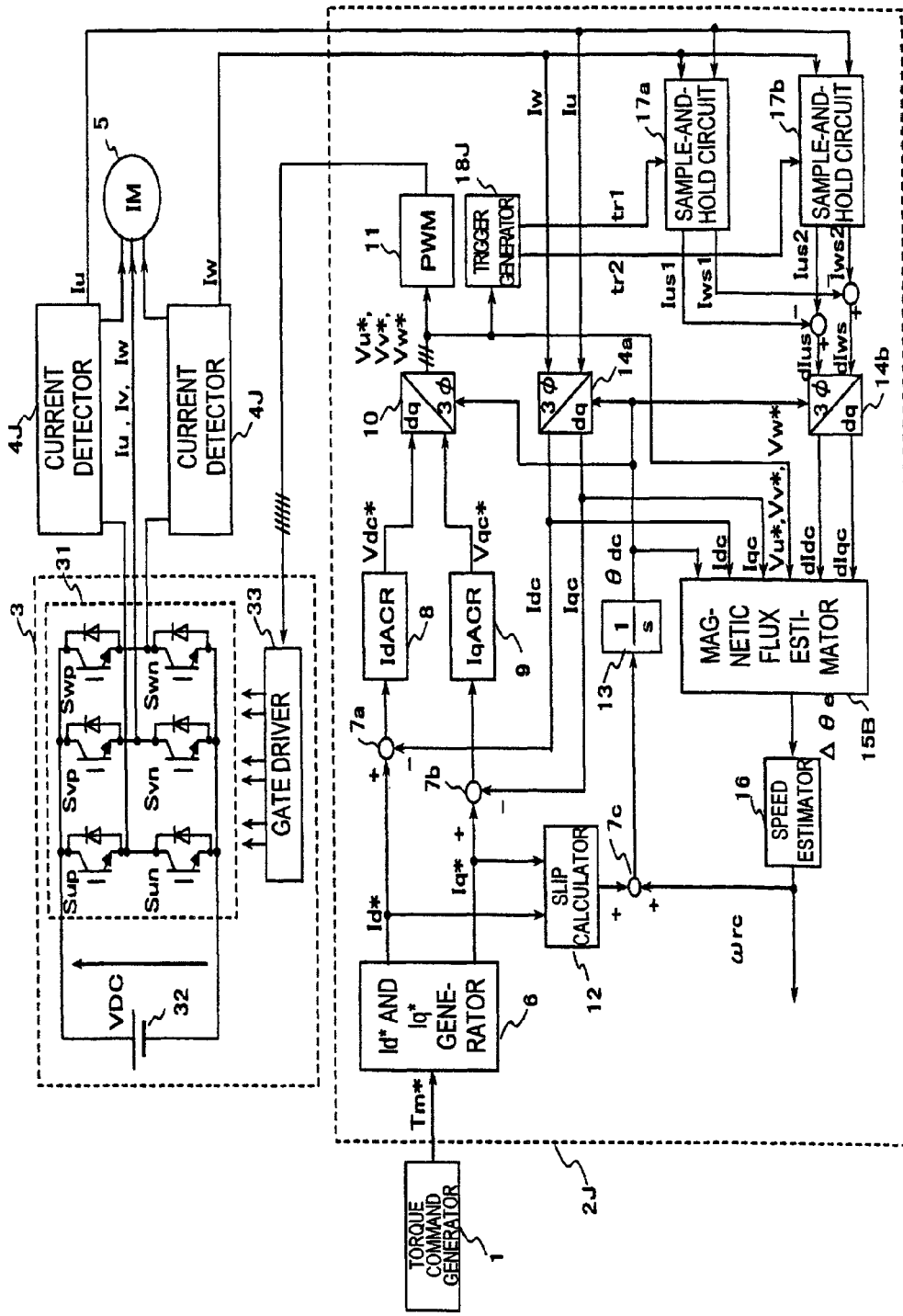
FIG. 26 is a block diagram illustrating a configuration of a drive device for an alternating current motor according to Embodiment 11 of the present invention.
Figure 27:
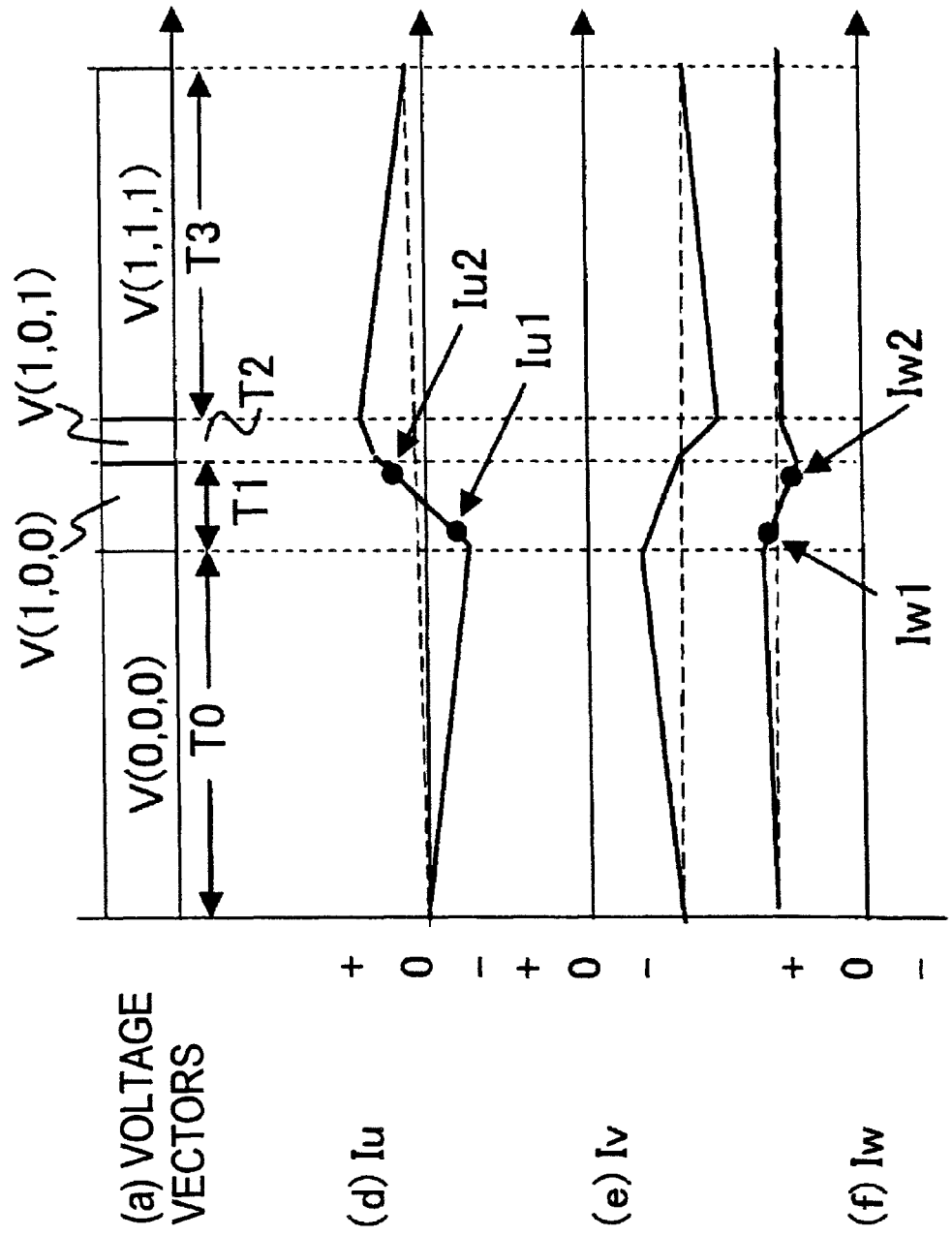
FIG. 27 is a chart showing a voltage vector and a current waveform according to Embodiment 11 of the present invention.

In FIG. 26, instead of the current/current change rate detector 4, a current detector 4J which is conventionally used is adopted. Instead, two sample-and-hold circuits 17 are provided, and the sampling is performed by the two circuits at different timings, to thereby obtain the current change rates.

In FIG. 26, the blocks denoted by part numbers 1 and 3 to 17 are identical with those denoted by the same numbers in the embodiments described above. A characteristic feature of the present embodiment resides in that two sample-and-hold signals are outputted from a trigger generator 18J to be inputted to the sample-and-hold circuits 7a and 7b, respectively. A current value is sampled twice for one voltage vector by using these signals tr1 and tr2. This state is shown in FIG. 27. FIG. 27 shows a state where the current is sampled twice during the output period of the voltage vector V (1, 0, 0). On the basis of a difference between the two current detection values, the current change rate is calculated and obtained.

When the function of calculating the current change rate is provided inside of the controller as described above, there is no need to attach an external current change rate sensor. It should be noted that a current change needs to be sufficiently large as an analog signal. A system which drives a high-capacity electric motor (for example, railway vehicle) is more suitable therefor. Because a carrier frequency cannot be made higher basically, current ripples tend to increase, and in order to reduce switching loss, the carrier frequency tends to be made lower. For such a purpose as described above, the present embodiment is most suitable in terms of configuring the system at low costs.

Embodiment 12

Next, Embodiment 12 of the present invention is described with reference to FIG. 28.

Figure 28:
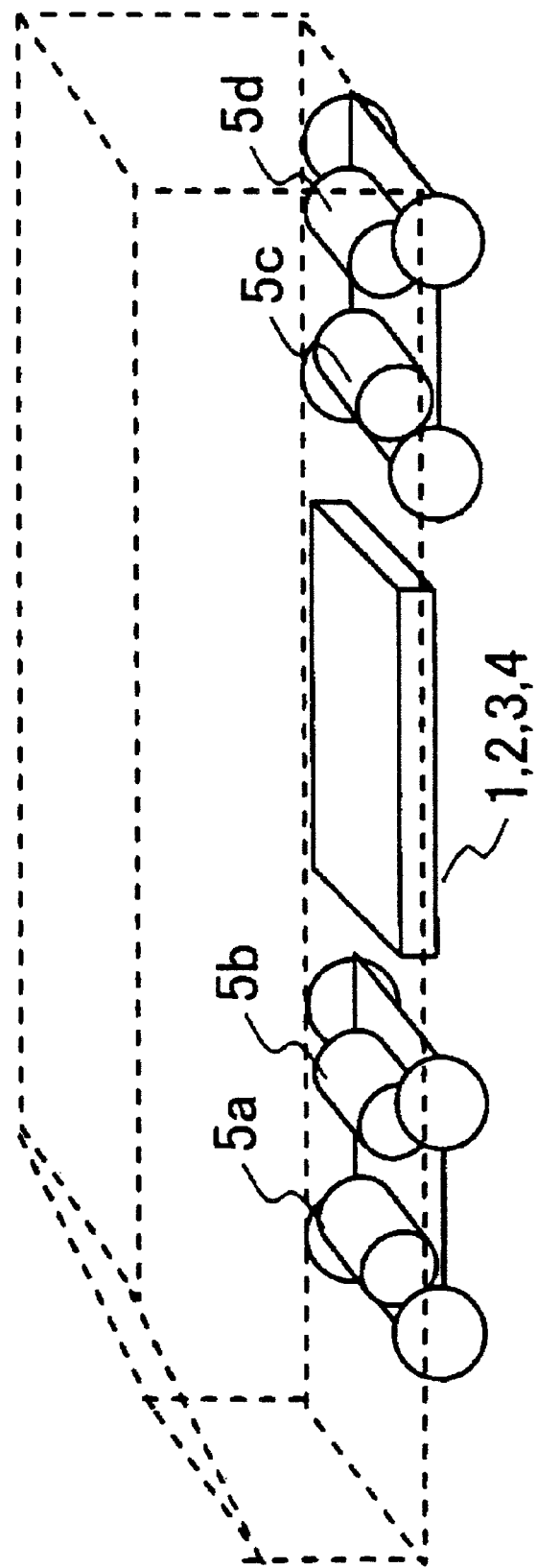
FIG. 28 is a diagram illustrating a configuration of a railway vehicle according to Embodiment 12 of the present invention.

In FIG. 28, the drive system for the alternating current motor according to the embodiments described above is applied to a railway vehicle. In the railway vehicle, a capacity of the electric motor is as high as 100 kW or larger, so that the carrier frequency cannot be set to be high. Under this circumstance, in order to perform low-speed sensorless driving, it is essential to apply a harmonic wave according to a conventional method. The application of the present invention enables the sensorless driving of the alternating current motor without applying a harmonic wave while maintaining an ideal PWM waveform.

Hereinabove, the embodiments of the present invention have been described. For ease of description, the induction motor and the PM motor are exemplified as the alternating current motor, but all of the embodiments can be applied to other alternating current motors, for example, a winding synchronous motor. In addition, in the current detection method described above, only two of the three-phase currents are detected, but all of the three-phase currents may be detected without any problem. In addition, for the current sensor, a method of detecting a direct bus current by means of a shunt resistor has been proposed. Also in the present invention, it is possible, in principle, to obtain the change rate on the basis of a detection value of the direct bus current, to thereby perform the position estimation.

It should be noted that the controller according to the present invention can be realized by a microcomputer, and the respective parts used for description can be realized as logic or software inside of the microcomputer.

As has already been described, the present invention relates to the technology for the drive device which can realize highly accurate driving in a region close to zero speed without using a rotational position sensor and a rotational speed sensor of the alternating current motor. The range in application of this device corresponds to such a purpose that a high torque is required at a low speed, and hence this device can be utilized for rotational speed and torque control of an electric railway and an electric automobile as well as an industrial inverter and a compressor, an elevator, and a conveyer which use the industrial inverter.

What is claimed is:

1. A drive device for an alternating current motor, comprising:
   an inverter which performs electric power conversion from a direct current to an alternating current;
   the alternating current motor which is connected to the inverter;
   a controller which outputs a pulse width modulation signal to the inverter, to thereby control the inverter; and
   means for applying a voltage to the alternating current motor so that, with respect to 360 degrees which is a fundamental wave cycle of an alternating current output, a line-to-line voltage waveform of the inverter exhibits a continuous positive pulse train during one 180-degree period and exhibits a continuous negative pulse train during another 180-degree period, and detecting a current and a current change rate of the alternating current motor,
   the alternating current motor being controlled on the basis of a detection value of the current and a detection value of the current change rate.

2. A drive device for an alternating current motor, comprising:
   an inverter which performs electric power conversion from a direct current to an alternating current;
   the alternating current motor which is connected to the inverter;
   a controller which outputs a pulse width modulation signal to the inverter, to thereby control the inverter; and
   means for providing minute pulses having an inverted polarity before and after pulses in a PWM pulse train of a line-to-line voltage waveform of the inverter, in at least part of the waveform, and detecting a current and a current change rate of the alternating current motor,
   the alternating current motor being controlled on the basis of a detection value of the current and a detection value of the current change rate.

3. The drive device for the alternating current motor according to claim 1, further comprising means for estimating a value of a current change caused by a voltage applied to the inverter,
   a magnetic flux position inside of the alternating current motor being estimated on the basis of a relation between the estimate value and the current change rate,
   the alternating current motor being controlled on the basis of the estimate value.

4. The drive device for the alternating current motor according to claim 2, further comprising means for estimating a value of a current change caused by a voltage applied to the inverter,
   a magnetic flux position inside of the alternating current motor being estimated on the basis of a relation between the estimate value and the current change rate,
   the alternating current motor being controlled on the basis of the estimate value.

5. The drive device for the alternating current motor according to claim 1, further comprising means for estimating and calculating a value of an electromotive voltage generated along with the current change on the basis of the detection value of the current change rate,
   a magnetic flux position inside of the alternating current motor being estimated on the basis of a relation between the estimate value and an output voltage of the inverter, the alternating current motor being controlled on the basis of the estimate value.

6. The drive device for the alternating current motor according to claim 2, further comprising means for estimating and calculating a value of an electromotive voltage generated along with the current change on the basis of the detection value of the current change rate,
a magnetic flux position inside of the alternating current motor being estimated on the basis of a relation between the estimate value and an output voltage of the inverter, the alternating current motor being controlled on the basis of the estimate value.

7. The drive device for the alternating current motor according to claim 3, wherein the magnetic flux position inside of the alternating current motor is estimated and calculated by using a function in which the detection value of the current is taken into consideration or a data table which is calculated in advance.

8. The drive device for the alternating current motor according to claim 1, wherein:
a period during which two types of switching states are continuously outputted is provided for the pulse train outputted from the inverter, the two types of switching states corresponding to states where switching states of the inverter do not become identical with each other in all of three phases (a state where upper arms in all of the three phases are not turned and a state where lower arms in all of the three phases are not turned on);
the current change rate is detected in at least one of the two types of continuous switching states; and
the alternating current motor is controlled on the basis of the detection value of the current change rate.

9. The drive device for the alternating current motor according to claim 8, wherein:
the current change rate is detected in each of output periods in the two types of switching states which are continuously outputted; and
the alternating current motor is controlled on the basis of each of the detection values of the current change rates in the two states.

10. The drive device for the alternating current motor according to claim 1, wherein the detection values of the means for detecting the current and the means for detecting the current change rate are sampled in response to an identical trigger signal so that all of the samplings are performed substantially simultaneously.

11. The drive device for the alternating current motor according to claim 1, wherein:
the means for detecting the current has a structure in which a power line for the alternating current motor passes completely through a ring-like magnetic core;
the magnetic core is provided with an auxiliary winding;
means for detecting a voltage between both ends of the auxiliary winding is further provided; and
the detected voltage is used as the detection value of the current change rate.

12. The drive device for the alternating current motor according to claim 1, wherein:
the means for detecting the current change rate includes means for detecting a voltage between both ends of the means for detecting the current of the alternating current motor; and
the detected voltage is used as the detection value of the current change rate.

13. The drive device for the alternating current motor according to claim 1, wherein:
the means for detecting the current change rate includes means in which an inductance is connected in series with the alternating current motor, for detecting a voltage between both ends of the inductance; and
the detected voltage is used as the detection value of the current change rate.

14. The drive device for the alternating current motor according to claim 1, wherein:
the means for detecting the current change rate includes an analog circuit or an analog-digital mixed circuit which is provided to an output of the means for detecting the current of the alternating current motor; and
the current change rate is obtained by signal processing.

15. The drive device for the alternating current motor according to claim 1, wherein:
a current value is sampled a plurality of times by the means for detecting the current during a period during which the switching states of the inverter are identical with each other (a period during which PWM pulses do not change); and
the detection value of the current change rate is obtained on the basis of the sampling value.

16. An electric motor vehicle, comprising the drive device for the alternating current motor according to claim 1.

* * * * *